US008116476B2

(12) United States Patent
Inohara

(10) Patent No.: US 8,116,476 B2
(45) Date of Patent: Feb. 14, 2012

(54) AUDIO SIGNAL RECEIVING APPARATUS, AUDIO SIGNAL RECEIVING METHOD AND AUDIO SIGNAL TRANSMISSION SYSTEM

(75) Inventor: Yuichi Inohara, Tokyo (JP)

(73) Assignee: Sony Corporation, Tokyo (JP)

(*) Notice: Subject to any disclaimer, the term of this patent is extended or adjusted under 35 U.S.C. 154(b) by 579 days.

(21) Appl. No.: 12/335,972

(22) Filed: Dec. 16, 2008

(65) Prior Publication Data

US 2009/0169030 A1 Jul. 2, 2009

(30) Foreign Application Priority Data

Dec. 27, 2007 (JP) ................................ 2007-337489

(51) Int. Cl.
*H04B 3/00* (2006.01)
*H04N 7/173* (2011.01)

(52) U.S. Cl. ................ 381/80; 381/17; 381/74; 381/77; 381/111; 369/30.23; 369/30.24; 369/47.11; 348/E5.099; 348/E5.104; 348/E5.108; 348/E5.112; 348/E5.128

(58) Field of Classification Search .................... 381/17, 381/74, 77, 80, 111; 369/30.23, 30.24, 47.11; 348/E5.099, E5.104, E5.108, E5.112, E5.128
See application file for complete search history.

(56) References Cited

U.S. PATENT DOCUMENTS 6,055,502 A * 4/2000 Kitamura ...................... 704/500
2004/0213543 A1* 10/2004 Onomatsu ....................... 386/46
2004/0223622 A1 11/2004 Lindemann et al.
2006/0080707 A1* 4/2006 Laksono ......................... 725/38

FOREIGN PATENT DOCUMENTS

EP 1 517 464 A2 3/2005
JP 2006-042064 A 2/2006
JP 2007-027928 A 2/2007

* cited by examiner

*Primary Examiner* — Dao H Nguyen
(74) *Attorney, Agent, or Firm* — Wolf, Greenfield & Sacks, P.C.

(57) ABSTRACT

An audio signal receiving apparatus includes a sound source information receiving portion to receive sound source information containing sound source type information indicating a sound source type of the audio signal being transmitted through channels and externally connected equipment playback sound source information indicating a sound source type of the audio signal being played back by the externally connected equipment from externally connected equipment, an audio signal receiving portion to receive the audio signal from the externally connected equipment, and a playbackable sound source setting portion to determine and set a sound source type of the audio signal that can played back to a playbackable sound source based on the sound source information. The playbackable sound source setting portion sets a sound source type of the audio signal being played back by the externally connected equipment to the playbackable sound source as an externally connected equipment playback sound source.

9 Claims, 29 Drawing Sheets

FIG.6A

| CH | No. | AUDIO DATA |
|---|---|---|
| CH 1 | No.1 | MAIN CHANNEL (L) |
| | No.2 | MAIN CHANNEL (R) |
| CH 2 | No.3 | SUB-CHANNEL 1 |
| | No.4 | SUB-CHANNEL 2 |
| CH 3 | No.5 | SUB-CHANNEL 3 |
| | No.6 | SUB-CHANNEL 4 |
| CH 4 | No.7 | SUB-CHANNEL 5 |
| | No.8 | SUB-CHANNEL 6 |

FIG.6B

| CH | No. | AUDIO DATA |
|---|---|---|
| CH 1 | No.1 | DVD |
| | No.2 | |
| CH 2 | No.3 | SURROUND REAR |
| | No.4 | |
| CH 3 | No.5 | SURROUND BACK |
| | No.6 | |
| CH 4 | No.7 | SUBWOOFER |
| | No.8 | |

FIG.6C

| CH | No. | AUDIO DATA |
|---|---|---|
| CH 1 | No.1 | MAIN CHANNEL 1 (L) |
| | No.2 | MAIN CHANNEL 1 (R) |
| CH 2 | No.3 | MAIN CHANNEL 2 (L) |
| | No.4 | MAIN CHANNEL 2 (R) |
| CH 3 | No.5 | MAIN CHANNEL 3 (L) |
| | No.6 | MAIN CHANNEL 3 (R) |
| CH 4 | No.7 | MAIN CHANNEL 4 (L) |
| | No.8 | MAIN CHANNEL 4 (R) |

FIG.6D

| CH | No. | AUDIO DATA |
|---|---|---|
| CH 1 | No.1 | CD |
| | No.2 | |
| CH 2 | No.3 | TUNER |
| | No.4 | |
| CH 3 | No.5 | DMPORT |
| | No.6 | |
| CH 4 | No.7 | AUDIO IN |
| | No.8 | |

FIG.7

| ABBREVIATION | NAME | FUNCTION |
|---|---|---|
| SR | SURROUND REAR Lch | SURROUND REAR SPEAKER Lch OUTPUT |
| | SURROUND REAR Rch | SURROUND REAR SPEAKER Rch OUTPUT |
| SB | SURROUND BACK Lch | SURROUND BACK SPEAKER Lch OUTPUT |
| | SURROUND BACK Rch | SURROUND BACK SPEAKER Rch OUTPUT |
| SRHP | SURROUND REAR HEADPHONE Lch | SURROUND REAR HEADPHONE TERMINAL Lch OUTPUT |
| | SURROUND REAR HEADPHONE Rch | SURROUND REAR HEADPHONE TERMINAL Rch OUTPUT |
| SBHP | SURROUND BACK HEADPHONE Lch | SURROUND BACK HEADPHONE TERMINAL Lch OUTPUT |
| | SURROUND BACK HEADPHONE Rch | SURROUND BACK HEADPHONE TERMINAL Rch OUTPUT |
| SW | SUBWOOFER Lch | SUBWOOFER Lch OUTPUT |
| | SUBWOOFER Rch | SUBWOOFER Rch OUTPUT |
| SW/C | SUBWOOFER MONO | SUBWOOFER MONO OUTPUT |
| | CENTER | CENTER SPEAKER OUTPUT |

FIG.8A

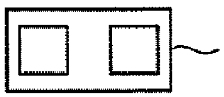

WHEN MASTER UNIT IS SURROUND MODE

| CH | No. | AUDIO DATA |
|---|---|---|
| CH 1 | No.1 | MAIN CHANNEL (L) |
| | No.2 | MAIN CHANNEL (R) |
| CH 2 | No.3 | SUB-CHANNEL 1 |
| | No.4 | SUB-CHANNEL 2 |
| CH 3 | No.5 | SUB-CHANNEL 3 |
| | No.6 | SUB-CHANNEL 4 |
| CH 4 | No.7 | SUB-CHANNEL 5 |
| | No.8 | SUB-CHANNEL 6 |

WHEN MASTER UNIT IS MULTI-SOURCE MODE

| CH | No. | AUDIO DATA |
|---|---|---|
| CH 1 | No.1 | MAIN CHANNEL 1 (L) |
| | No.2 | MAIN CHANNEL 1 (R) |
| CH 2 | No.3 | MAIN CHANNEL 2 (L) |
| | No.4 | MAIN CHANNEL 2 (R) |
| CH 3 | No.5 | MAIN CHANNEL 3 (L) |
| | No.6 | MAIN CHANNEL 3 (R) |
| CH 4 | No.7 | MAIN CHANNEL 4 (L) |
| | No.8 | MAIN CHANNEL 4 (R) |

FIG.8B

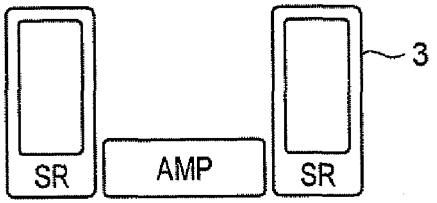

PLAY BACK AUDIO DATA OF SR

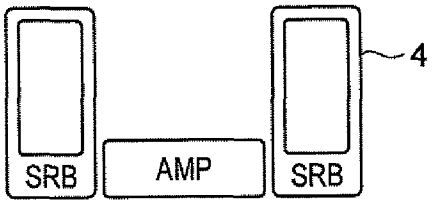

PLAY BACK AUDIO DATA OF SRB

WHEN MASTER UNIT IS SURROUND MODE

| CH | No. | AUDIO DATA |
|---|---|---|
| CH 1 | No.1 | MAIN CHANNEL (L) |
| | No.2 | MAIN CHANNEL (R) |
| CH 2 | No.3 | SUB-CHANNEL 1 |
| | No.4 | SUB-CHANNEL 2 |
| CH 3 | No.5 | SUB-CHANNEL 3 |
| | No.6 | SUB-CHANNEL 4 |
| CH 4 | No.7 | SUB-CHANNEL 5 |
| | No.8 | SUB-CHANNEL 6 |

WHEN MASTER UNIT IS MULTI-SOURCE MODE

| CH | No. | AUDIO DATA |
|---|---|---|
| CH 1 | No.1 | MAIN CHANNEL 1 (L) |
| | No.2 | MAIN CHANNEL 1 (R) |
| CH 2 | No.3 | MAIN CHANNEL 2 (L) |
| | No.4 | MAIN CHANNEL 2 (R) |
| CH 3 | No.5 | MAIN CHANNEL 3 (L) |
| | No.6 | MAIN CHANNEL 3 (R) |
| CH 4 | No.7 | MAIN CHANNEL 4 (L) |
| | No.8 | MAIN CHANNEL 4 (R) |

FIG.9A

| CH | AUDIO DATA |
|---|---|
| CH 1 | DVD |
| CH 2 | SURROUND REAR |
| CH 3 | SURROUND BACK |
| CH 4 | SUBWOOFER |

| CH | AUDIO DATA |
|---|---|
| CH 1 | TUNER |
| CH 2 | SURROUND REAR |
| CH 3 | SURROUND BACK |
| CH 4 | SUBWOOFER |

| CH | AUDIO DATA |
|---|---|
| CH 1 | AUDIO IN |
| CH 2 | SURROUND REAR |
| CH 3 | SURROUND BACK |
| CH 4 | SUBWOOFER |

FIG.17

| MODE | PURPOSE | FUNCTION COMPARISON | | | |
|---|---|---|---|---|---|
| | | LISTEN TO SAME FUNCTION AS MASTER UNIT BY SLAVE UNIT | SWITCH FUNCTION OF MASTER UNIT BY SLAVE UNIT | LISTEN TO DIFFERENT FUNCTIONS FROM MASTER UNIT BY SLAVE UNIT | SWITCH FUNCTION DIFFERENT FROM MASTER UNIT BY SLAVE UNIT |
| PARTY MODE | MANY USERS LISTEN TO SAME SOURCE IN MULTIPLE ROOMS | POSSIBLE | POSSIBLE | IMPOSSIBLE | IMPOSSIBLE |
| SEPARATE MODE | USER IN ROOM WITH MASTER UNIT AND USER IN ROOM WITH SLAVE UNIT LISTEN TO DIFFERENT SOURCES CONCURRENTLY | POSSIBLE | IMPOSSIBLE | POSSIBLE | POSSIBLE |

FIG.18

| SUB-FUNCTION |
| --- |
| MAIN UNIT |
| CD |
| DVD |
| BD |
| FM |
| AM |
| XM |
| DMPORT |
| AUDIO IN |

⋮

FIG.19A

| | (1) ⇒ (2) ⇒ (3) ⇒ (4) |
| --- | --- |
| MASTER UNIT FUNCTION | DVD ⇒ FM ⇒ AM ⇒ XM |
| SUB-FUNCTION | AM ⇒ FM ⇒ AM ⇒ AM |

FIG.19B

| | (1) ⇒ (2) ⇒ (3) |
| --- | --- |
| MASTER UNIT FUNCTION | AM ⇒ AM ⇒ AM |
| SUB-FUNCTION | XM ⇒ AM ⇒ MAIN UNIT |

AUDIO SIGNAL RECEIVING APPARATUS, AUDIO SIGNAL RECEIVING METHOD AND AUDIO SIGNAL TRANSMISSION SYSTEM

CROSS-REFERENCE TO RELATED APPLICATION

The present invention contains subject matter related to Japanese Patent Application JP 2007-337489 filed in the Japan Patent Office on Dec. 27, 2007, the entire contents of which being incorporated herein by reference.

BACKGROUND OF THE INVENTION

1. Field of the Invention

The present invention relates to an audio signal receiving apparatus, an audio signal receiving method, a program, and an audio signal transmission system.

2. Description of the Related Art

With the recent proliferation of home theater systems or the like and the development of information transmission technology, a technique of transmitting audio signals using a plurality of channels has become widely used. In such a home theater system, an apparatus that transmits an audio signal and an apparatus that receives the audio signal are usually connected using a connecting cord.

On the other hand, in order to increase the flexibility of the layout of a plurality of speakers that constitute a home theater system, an attempt to connect an apparatus at the transmitting end and a speaker, which is an apparatus at the receiving end, wirelessly without using a connecting cord is being made.

With a view to realize such a wireless connection, a method of transmitting an audio signal using infrared rays is disclosed (e.g. Japanese Unexamined Patent Application Publication No. 2007-27928).

SUMMARY OF THE INVENTION

However, the method disclosed in Japanese Unexamined Patent Application Publication No. 2007-27928 has an issue that because the spectrum to be used for transmission of a signal is the infrared range, transmission of an audio signal fails if an obstruction exists between the apparatus at the transmitting end and the apparatus at the receiving end.

Further, an audio signal receiving apparatus (slave unit) hitherto used merely receives the audio signal transmitted from an audio signal transmitting apparatus (master unit), thus not allowing a user to make any control (e.g. a control to switch the audio signal being transmitted) on the audio signal transmitting apparatus by means of operating the audio signal receiving apparatus.

In light of the foregoing, it is desirable to provide a novel and improved audio signal receiving apparatus, an audio signal receiving method and an audio signal transmission system capable of switching an audio signal being transmitted from a master unit by means of operating a slave unit that is receiving the audio signal and further preventing operation performed on the slave unit from affecting the master unit.

According to an embodiment of the present invention, there is provided an audio signal receiving apparatus to receive an audio signal transmitted from externally connected equipment through a plurality of channels, which includes a sound source information receiving portion to receive sound source information containing sound source type information indicating a sound source type of the audio signal being transmitted through each of the plurality of channels and externally connected equipment playback sound source information indicating a sound source type of the audio signal being played back by the externally connected equipment, an audio signal receiving portion to receive the audio signal transmitted through each of the plurality of channels, and a playbackable sound source setting portion to determine and set a sound source type of the audio signal able to be played back to a playbackable sound source based on the sound source information, wherein the playbackable sound source setting portion sets a sound source type of the audio signal being played back by the externally connected equipment to the playbackable sound source.

The audio signal receiving apparatus may further include a sound source selection portion to select a sound source to be played back from the playbackable sound source.

When the sound source selection portion selects the audio signal corresponding to a first channel and the externally connected equipment playback sound source information changes to information indicating the audio signal corresponding to the first channel, the playbackable sound source setting portion may store a state of the audio signal receiving apparatus immediately before the change.

When the externally connected equipment playback sound source information is information indicating the audio signal corresponding to a first channel and the sound source selection portion selects the audio signal corresponding to the first channel, the playbackable sound source setting portion may inhibit selection of a band different from a band of the first channel being played back by the externally connected equipment.

The audio signal receiving apparatus may further include a display portion to display prescribed information, and the display portion may display information indicating being a sound source of the audio signal being played back by the externally connected equipment and information indicating the sound source type being played back by the externally connected equipment.

The playbackable sound source setting portion may change a displayed indication of the sound source type described in the externally connected equipment playback sound source information so as to indicate being the sound source type being played back by the externally connected equipment.

When the audio signal receiving portion receives the audio signal corresponding to the sound source type described in the externally connected equipment playback sound source information, a control of the externally connected equipment by the audio signal receiving apparatus may be inhibited.

According to another embodiment of the present invention, there is provided an audio signal receiving method to receive an audio signal transmitted from externally connected equipment through a plurality of channels, which includes the steps of receiving sound source information containing sound source type information indicating a sound source type of the audio signal being transmitted through each of the plurality of channels and externally connected equipment playback sound source information indicating a sound source type of the audio signal being played back by the externally connected equipment from the externally connected equipment, determining and setting a sound source type of the audio signal able to be played back to a playbackable sound source based on the sound source information and further setting a sound source of the audio signal being played back by the externally connected equipment to the playbackable sound source as an externally connected equipment playback sound source, and receiving the audio signal from the externally connected equipment.

According to another embodiment of the present invention, there is provided an audio signal transmission system including an audio signal transmitting apparatus to transmit an audio signal through a plurality of channels and an audio signal receiving apparatus to receive the audio signal transmitted from the audio signal transmitting apparatus. In the audio signal transmission system, the audio signal transmitting apparatus includes a transmission control portion to transmit sound source information containing sound source type information indicating a sound source type of the audio signal being transmitted through each of the plurality of channels and externally connected equipment playback sound source information indicating a sound source type of the audio signal being played back by the audio signal transmitting apparatus to the audio signal receiving apparatus, and an audio signal transmitting portion to transmit the audio signal to the audio signal receiving apparatus. Further, the audio signal receiving apparatus includes a sound source information receiving portion to receive sound source information containing sound source type information indicating a sound source type of the audio signal being transmitted through each of the plurality of channels and externally connected equipment playback sound source information indicating a sound source type of the audio signal being played back by the audio signal transmitting apparatus from the audio signal transmitting apparatus, an audio signal receiving portion to receive the audio signal from the audio signal transmitting apparatus, and a playbackable sound source setting portion to determine and set a sound source type of the audio signal able to be played back to a playbackable sound source based on the sound source information, wherein the playbackable sound source setting portion sets a sound source of the audio signal being played back by the audio signal transmitting apparatus to the playbackable sound source.

According to the embodiments of the present invention described above, it is possible to switch an audio signal being transmitted from a master unit by means of operating a slave unit that is receiving the audio signal and further preventing operation performed on the slave unit from affecting the master unit.

BRIEF DESCRIPTION OF THE DRAWINGS

FIG. 6A is an explanatory view illustrating the mode of a master unit in the basic technique.

FIG. 6B is an explanatory view illustrating the mode of a master unit in the basic technique.

FIG. 6C is an explanatory view illustrating the mode of a master unit in the basic technique.

FIG. 6D is an explanatory view illustrating the mode of a master unit in the basic technique.

FIG. 7 is an explanatory view illustrating an example of the kind of sub-channels in the basic technique.

FIG. 8A is an explanatory view illustrating an audio signal that can be played back by a main slave unit.

FIG. 8B is an explanatory view illustrating an audio signal that can be played back by a sub-slave unit.

FIG. 9A is an explanatory view illustrating channel switching in the basic technique.

FIG. 17 is an explanatory view illustrating an audio signal playback mode in the audio signal receiving apparatus according to the embodiment.

FIG. 18 is an explanatory view illustrating a playbackable sound source according to the embodiment.

FIG. 19A is an explanatory view illustrating an example of an audio signal receiving method according to the embodiment.

FIG. 19B is an explanatory view illustrating an example of an audio signal receiving method according to the embodiment.

DETAILED DESCRIPTION OF THE PREFERRED EMBODIMENTS

Figure 1:
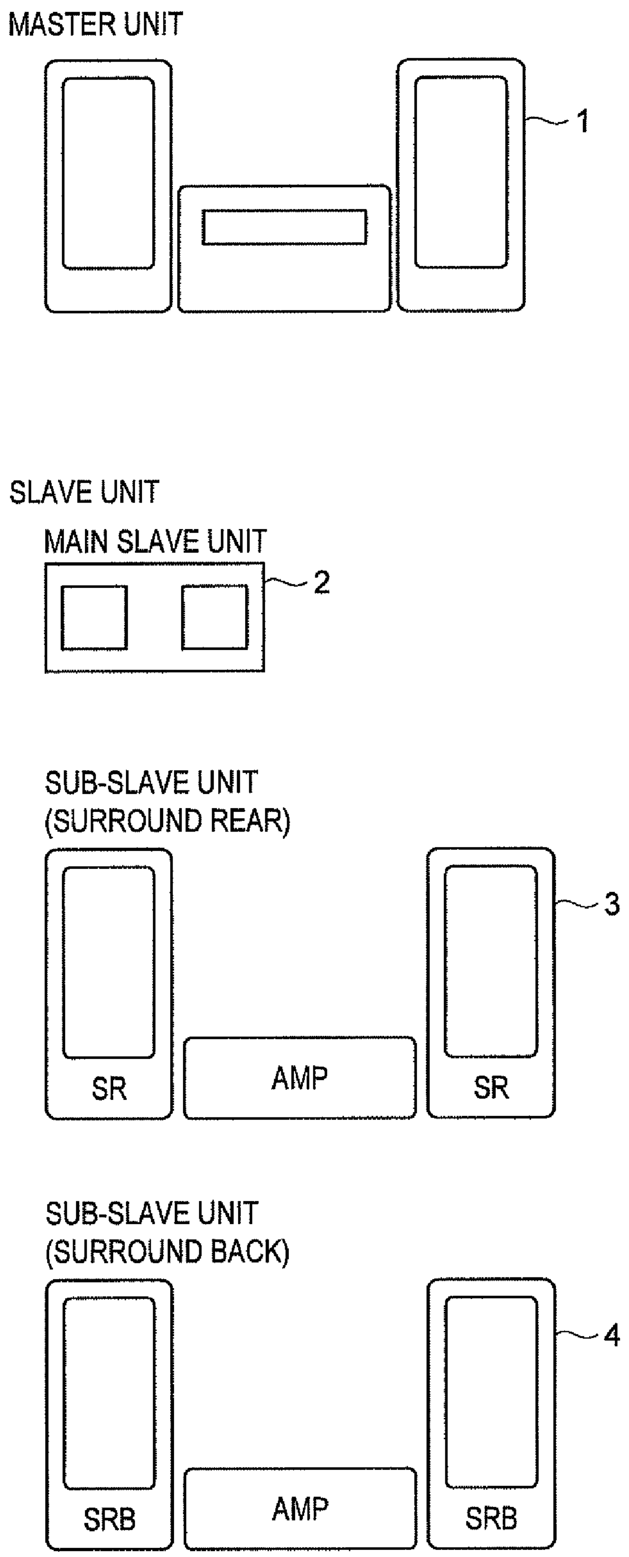
FIG. 1 is an explanatory view to explain the illustration of each device in the basic technique.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

(Technique as the Basis of the Present Invention)

An audio signal transmission technique, which is a technique as the basis of the present invention (which is also referred to hereinafter as the basic technique), is described hereinafter in detail with reference to FIGS. 1 to 10.

<Definition of Terms>

The terms that are used for explaining the basic technique are defined as follows.

S-AIR: The name of a wireless audio transmission technique, which is the basic technique described below. It is an abbreviation of Sony Audio Interactive Radio frequency. The basic technique is also referred to hereinafter as S-AIR.

Source: A sound source of an audio signal.

Channel: A path for transmitting an audio signal, data and so on. Because transmission of a 4-channel stereo audio signal, for example, is possible in S-AIR, audio transmission channels are represented as CH1, CH2, CH3 and CH4.

Main channel: A channel which a main slave unit can play back. An independent source is basically allocated to the main channel. The main slave unit is defined later.

Sub-channel: A channel which a sub-slave unit can play back. An audio signal that is derived from one source is mainly allocated to the sub-channel as a surround audio signal. The sub-slave unit is defined later.

Master unit: A device capable of transmitting an audio signal (an audio signal transmitting apparatus). The master unit is in either state of surround mode or multi-source mode according to the capability of the unit. In the master unit of the surround mode, only the channel (CH) 1 serves as a main channel, and the other channels serve as a sub-channel. On the other hand, in the mater unit of the multi-source mode, all channels serve as a main channel.

Slave unit: A device capable of receiving an audio signal (an audio signal receiving apparatus). The slave unit is in either state of a main slave unit to play back a main channel or a sub-slave unit to play back a sub channel.

Main slave unit: A slave unit to play back the main channel of the master unit. If the master unit is in the surround mode, all main slave units linked to the master unit can play back CH1. On the other hand, if the master unit is in the multi-source mode, each main slave unit can select one channel from CH1, CH2, CH3 and CH4 and play back the selected channel.

Sub-slave unit: A slave unit to play back the sub-channel of the master unit. If the master unit is in the surround mode, the sub-slave unit can select and play back the sub-channel of the master unit that matches its own function according to channel mapping. If the master unit does not have the sub-channel function which the sub-slave unit has, the sub-slave unit does not play back any channel. On the other hand, if the master unit is in the multi-source mode, the sub-slave unit is difficult to be linked to the master unit.

ID (S-AIR ID): An identifier to prevent wrong connection between the master unit and the slave unit.

Sync: A term indicating the state where the master unit and the slave unit can communicate with each other.

Link: A term indicating the state where an audio signal can be actually played back after certain procedural steps following the state where the master unit and the slave unit are in sync.

Pairing mode: An operation to enable a link between a particular master unit and a particular slave unit in order to prevent a link with an unintended slave unit.

Room: A unit indicating the number of sources which the master unit can play back and transmit simultaneously. In S-AIR, the source which the master unit plays back is specified as a main room, and the sources to be transmitted to the wireless audio transmission channels CH1, CH2, CH3 and CH4 are specified as a room 1, a room 2, a room 3 and a room 4, respectively. If the master unit is in the surround mode, because only CH1 is the main channel, the number of sources that can be played back and transmitted is 2 rooms, which are the main room and the room 1. On the other hand, if the master unit is in the multi-source mode, the number of sources that can be played back and transmitted is a maximum 5 rooms, which are the main room and the rooms 1 to 4.

Function: A term indicating the function which a device has. If the slave unit has a plurality of functions, the basic technique serves as one of the functions.

Main function: A term indicating the case where the source flowing through the main channel is the same source as the main room.

Sub-function: A term indicating the case where the source flowing through the main channel is a different source from the main room.

Party mode: A mode to distribute the main function to the main slave unit, so that all of the linked main slave units play back the same source as the main unit. An operation on the main unit performed by the main unit and the main slave unit is reflected on all slave units.

Separate mode: A mode to distribute the sub-function to the main slave unit. Each main slave unit plays back the source which it selects.

S-AIR mode: The name of a button to switch a music source to be distributed to the main channel to the party mode or the separate mode.

In the examples (use cases) shown in FIGS. 2 to 10, the master unit and the slave units are represented as shown in FIG. 1. FIG. 1 is an explanatory view to explain the illustration of each device in the basic technique. In FIGS. 2 to 10 described below, the master unit is illustrated as denoted by the symbol 1 in FIG. 1. Further, the main slave unit is illustrated as denoted by the symbol 2, and the sub-slave unit is illustrated as denoted by the symbol 3 or 4.

<Outline of the Basic Technique>

Figure 2:
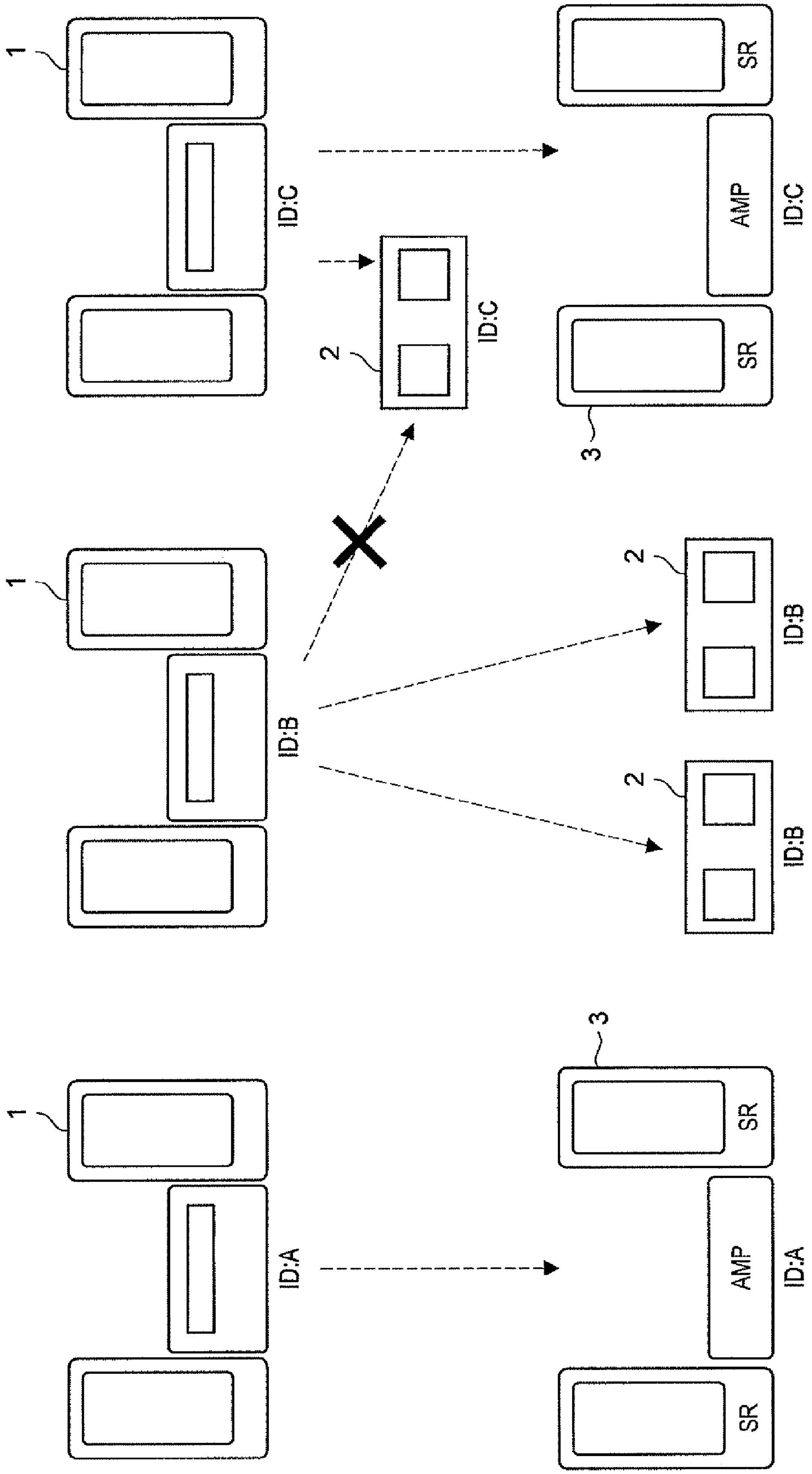
FIG. 2 is an explanatory view illustrating the outline of the functions in the basic technique.

The outline of the functions in S-AIR is described in detail hereinafter with reference to FIG. 2. FIG. 2 is an explanatory view illustrating the outline of the functions in the basic technique.

S-AIR (Sony Audio Interactive Radio frequency) is a specification to transmit audio signals from one master unit to a plurality of slave units, and it has the following features, for example.

(1) S-AIR can be used as a successor to the digital wireless optical transmission technology, and it enables implementation of a simple multi-room system.

(2) S-AIR enables transmission of a 2-channel stereo linear PCM audio signal through four lines simultaneously at CD quality.

(3) S-AIR has a data channel in addition to an audio channel, so that it enables transmission between the master unit and the slave unit.

(4) Although S-AIR is the 2.4 GHz wireless communication system, it is not compatible with Bluetooth or wireless LAN (IEEE 802.11b/g etc.)

Further, if the S-AIR ID matches between the master unit and the slave unit as shown in FIG. 2, for example, the master unit and the slave unit are linked simply by turning on the power, enabling wireless music playback.

[Outline of Master Unit Functions]

Examples of the principal functions which the S-AIR master unit has are that it is capable of transmitting an audio signal to the slave unit, capable of controlling the volume of the slave unit, and capable of acquiring the state of the slave unit.

[Outline of Slave Unit Functions]

Examples of the principal functions which the S-AIR slave unit has are that it is capable of playing back the audio signal transmitted from the master unit, capable of being used by a sub-slave unit or a main slave unit, and capable of displaying data transmitted from the master unit. Some S-AIR slave unit is capable of controlling the running state of the master unit.

[Key Definition]

The keys to be used in S-AIR are as shown in the following Table 1, for example.

TABLE 1

| | Function name | Master unit | Slave unit |
|---|---|---|---|
| | Basic function | | |
| 1 | Power | ○ | ○ |
| | S-AIR ID switching | ◎ | ◎ |
| | Pairing | ◎ | ◎ |
| | S-AIR channel switching | — | ◎ |
| | Surround switching | — | ○ |
| | Volume+/− | ○ | ○ |
| | Function+/− | ○ | |
| | Running system control (including Tuner) | | |
| 2 | Play | — | ○ |
| | Pause | — | ○ |
| | Stop | — | ○ |
| | FF/FR | — | ○ |
| | AMS+/− | — | ○ |
| | Album+/− | — | ○ |
| | Band | — | ○ |

In the above Table 1, "◎" indicates an essential key, "○" indicates an option, and "—" indicates not being specified.

<Connection Between the Master Unit and the Slave Unit>

The functions of at least either one of a connection control portion that is included in the master unit and composed of a central processing unit (CPU), read only memory (ROM), random access memory (RAM), digital signal processor (DSP), an external device communication portion and so on or a connection control portion that is included in the slave unit and composed of CPU, ROM, RAM, DSP, an external device communication portion and so on are described hereinafter in detail. The connection control portion included in the master unit and the slave unit may further include a plurality of processing portions that are specialized to each function described below.

[Connectable Devices]

Figure 3A:
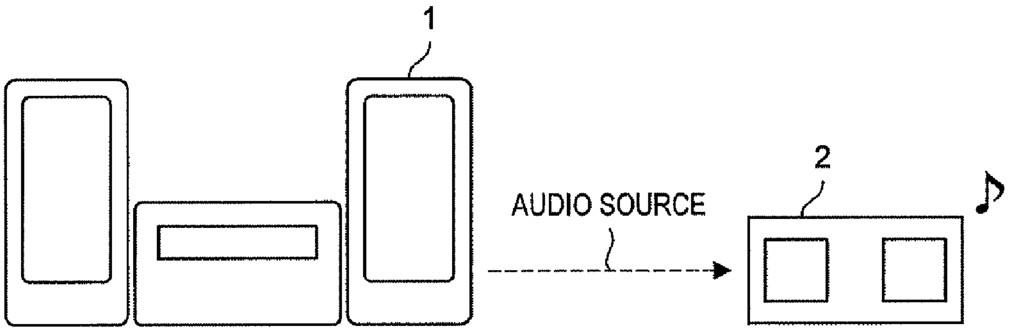
FIG. 3A is an explanatory view illustrating a device connection in the basic technique.

The devices that can be connected in S-AIR are described hereinafter in detail with reference to FIGS. 3A to 3D. FIGS. 3A to 3D are explanatory views illustrating device connections in the basic technique. The S-AIR connection is possible only between the master unit and the slave unit as shown in FIG. 3A, for example. Between the master unit and the slave unit being connected, an audio source is transmitted from the master unit to the slave unit. Although a connection between the master unit 1 and the main slave unit 2 is shown in FIG. 3A, a connection between the master unit and the sub-slave unit is also possible.

Figure 3B:
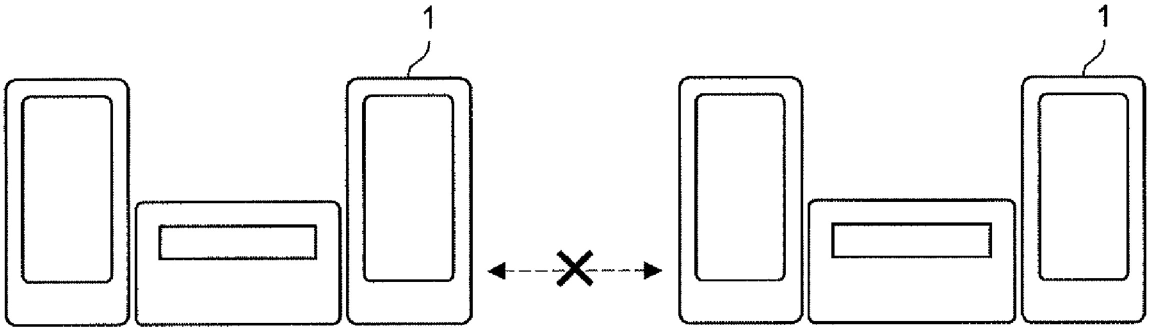
FIG. 3B is an explanatory view illustrating a device connection in the basic technique.
Figure 3C:
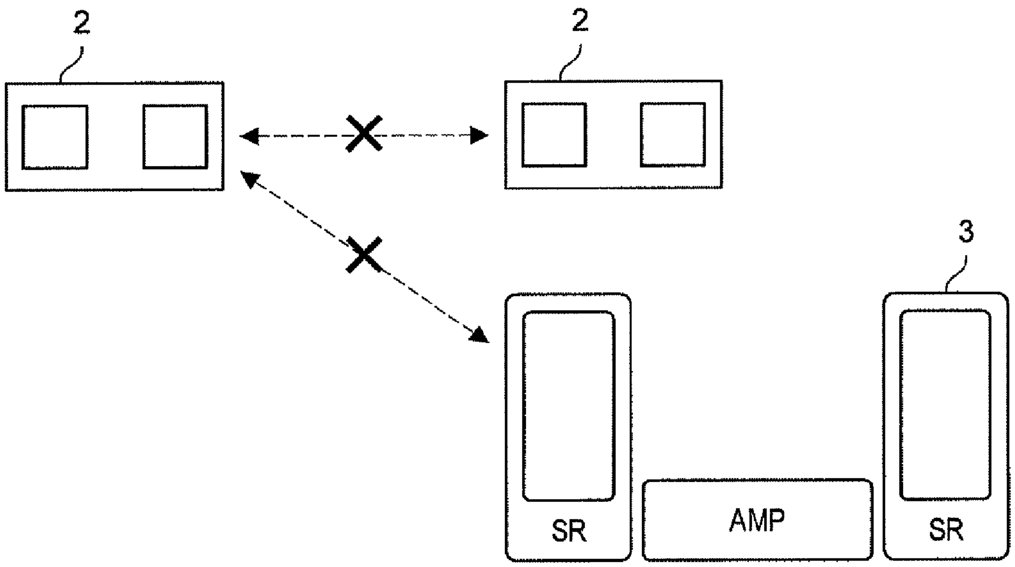
FIG. 3C is an explanatory view illustrating a device connection in the basic technique.

On the other hand, a connection between the master unit 1 and another master unit 1 is difficult as shown in FIG. 3B, for example. Further, a connection between the main slave unit 2 and another main slave unit 2 and a connection between the main slave unit 2 and the sub-slave unit 3 are also difficult as shown in FIG. 3C, for example.

Figure 3D:
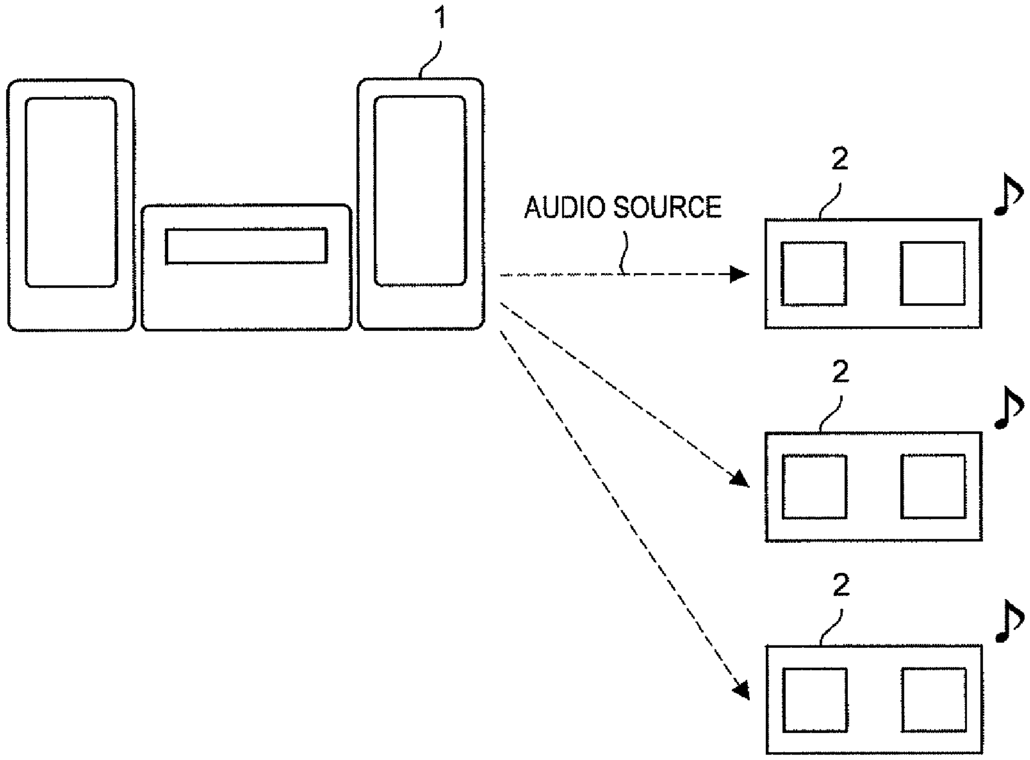
FIG. 3D is an explanatory view illustrating a device connection in the basic technique.

It is possible to connect a plurality of slave units to one main unit 1 as shown in FIG. 3D, for example, and to output (play back) the sound of the master unit from the respective slave units.

Specifically, in S-AIR, the slave unit can play back the music source of the connected master unit, and the slave unit having a display function can display information transmitted from the master unit. Further, the master unit can respond to the operation performed in the slave unit. In S-AIR, a connection between the master units and between the slave units may be impossible.

[Connection of S-AIR Devices]

S-AIR allows the master unit and the slave unit to be connected to each other by a simple procedure, so that the slave unit can play back the music transmitted from the master unit. Specifically, if the master unit is powered on and the slave unit is powered on, the connection control portions of the master unit and the slave unit try to establish a link between the master unit and the slave unit. If the S-AIR IDs (IDs) of the master unit and the slave unit are the same, the connection control portions of the master unit and the slave unit complete the connection between the master unit and the slave unit. If the link is completed, an audio signal playback portion of the slave unit can play back the music source transmitted from the master unit.

[S-AIR ID (ID)]

Figure 4A:
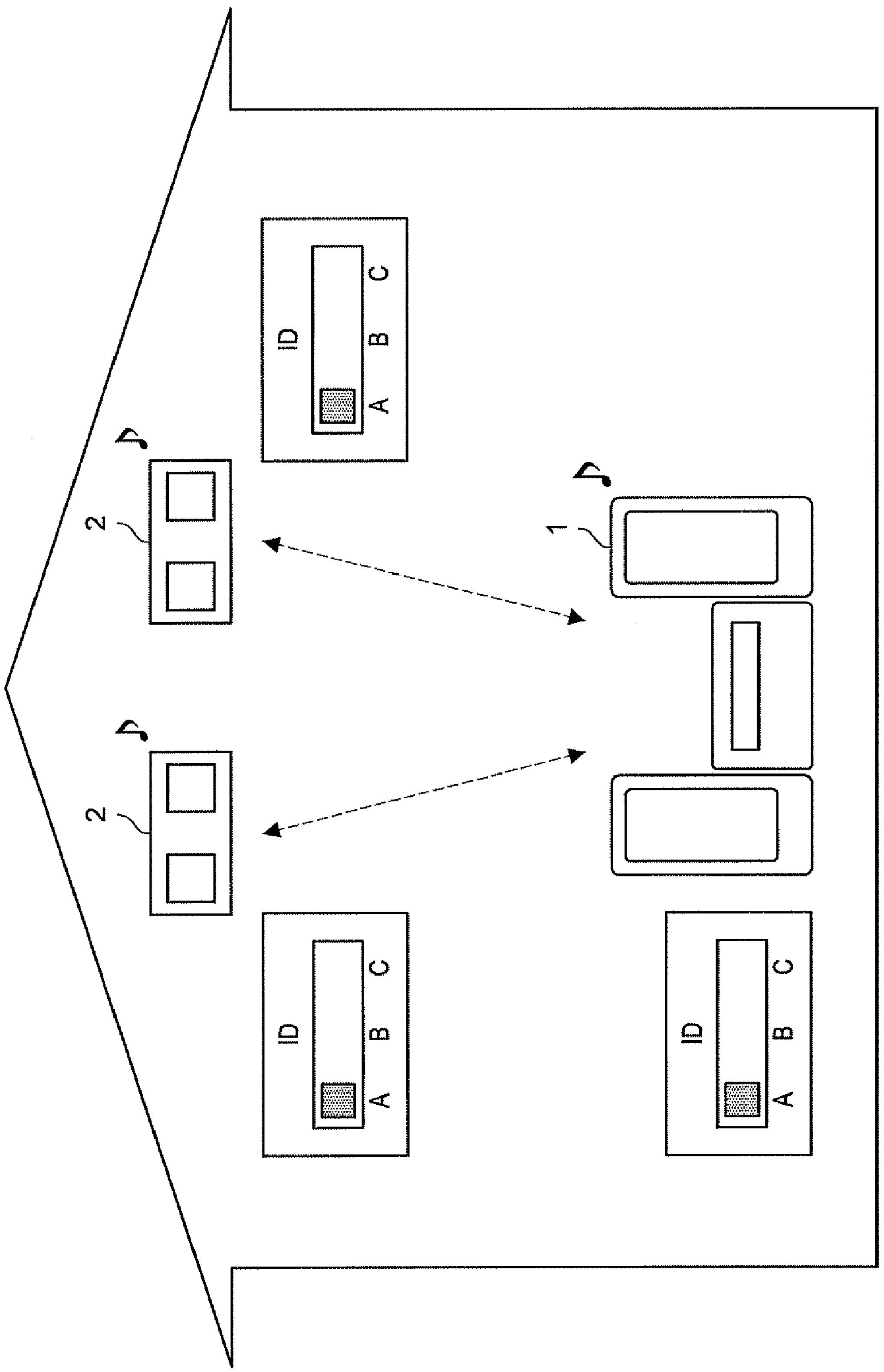
FIG. 4A is an explanatory view illustrating the function of an ID in the basic technique.
Figure 4B:
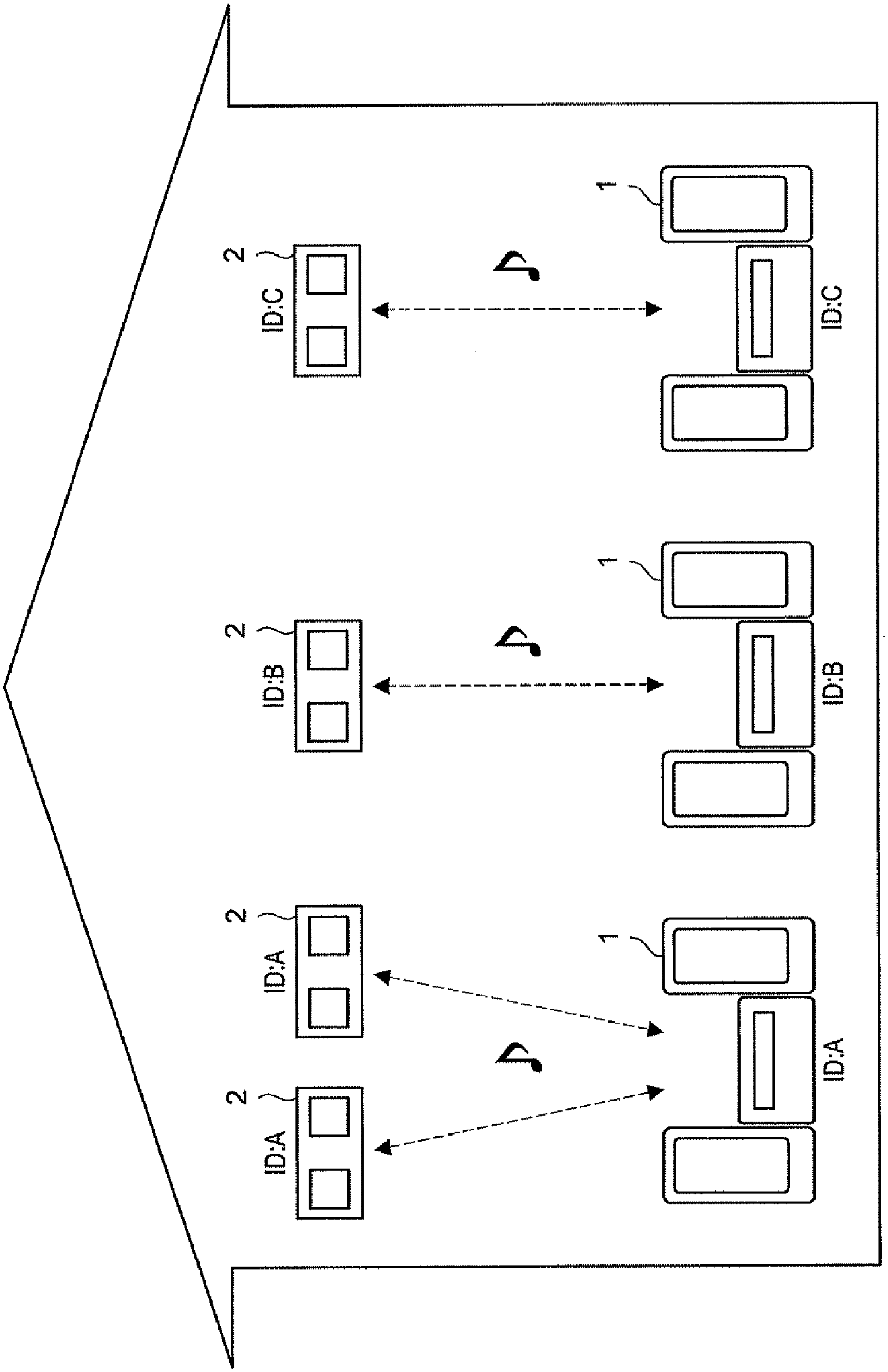
FIG. 4B is an explanatory view illustrating the function of an ID in the basic technique.

Referring then to FIGS. 4A and 4B, the function of the ID is described hereinafter in detail. FIGS. 4A and 4B are explanatory views illustrating the function of the ID in the basic technique.

The S-AIR ID (ID) is used to establish a connection with a desired master unit by making the S-AIR ID of the slave unit match the S-AIR ID of the master unit which a user desires to listen to (the master unit desired to be connected). In S-AIR, the frequency range to be used for two-way communication is divided into several regions, and a different S-AIR ID is assigned to each region. In the case where there are a plurality of master units, S-AIR allows maximum three master units, for example, to coexist by differentiating S-AIR IDs. FIGS. 4A and 4B show the case where three S-AIR IDs, A, B and C, exist.

The example shown in FIG. 4A is the case where one master unit 1 with the ID (S-AIR ID) set to A and two main slave units 2 with the ID (S-AIR ID) set to A exist. If the main slave unit 2 intends to establish a connection with the master unit 1, the connection control portion of at least one of the master unit 1 and the main slave unit 2 transmits the ID that is set to itself to the unit desired to be connected. The connection control portion of the unit that has received the ID checks whether the IDs match and thereby determines whether to establish the connection. Because the master unit 1 and the two main slave units 2 have the same ID in the example shown in FIG. 4A, each of the two main slave units 2 can establish a connection with the master unit 1.

Further, even if a plurality of master units exist in the same area as shown in FIG. 4B, for example, the plurality of master units can coexist by setting the S-AIR IDs of the master units 1 to different values. The number of master units that can coexist in the same area varies according to the number of IDs. Because the number of IDs is three in the examples shown in FIGS. 4A and 4B, the number of master units that can coexist in the same area is three at maximum.

On the other hand, although the number of slave units that can be connected to one master unit can be set to an arbitrary value, it may be set so as to ensure the connection of maximum 10 units including main slave units and sub-slave units, for example. Likewise, although the number of sub-slave units that can be connected to one sub-channel can be set to an arbitrary value, it may be set so that maximum two sub-slave units can be connected to one sub-channel.

[Switching of S-AIR ID]

In the case where the master/slave units having different S-AIR IDs exist in the same area, a connection is immediately started between the master unit and the slave unit at the time of switching the ID of the master/slave unit, so that the slave unit plays back the sound of the master unit to which the same ID is set.

If there is a slide switch as shown in FIG. 4A in the master unit or the slave unit, switching of the S-AIR ID is made by setting the switch to a desired ID. Further, if there is a display portion in the master unit or the slave unit, the ID of the unit can be set on software by operating a setting menu or the like. When switching of the S-AIR ID is performed, the connection control portion of each unit changes the frequency range to be used for two-way communication to a prescribed frequency range according to the setting.

By switching the S-AIR ID as described above, for example, the slave unit becomes able to play back the audio source of the master unit to which the same ID as the ID selected by the slave unit is set.

[Pairing Function]

Figure 5A:
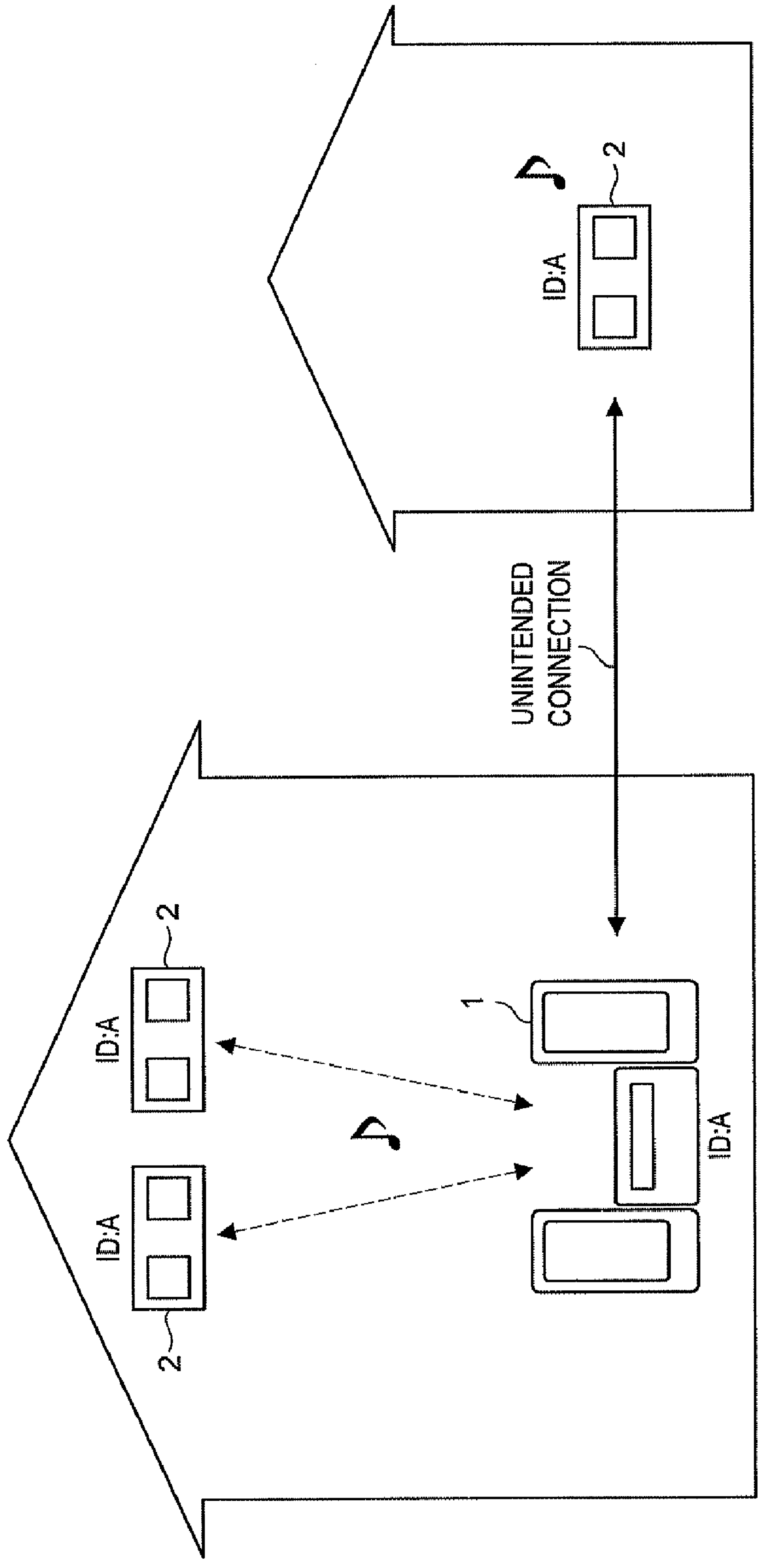
FIG. 5A is an explanatory view illustrating the pairing function in the basic technique.
Figure 5B:
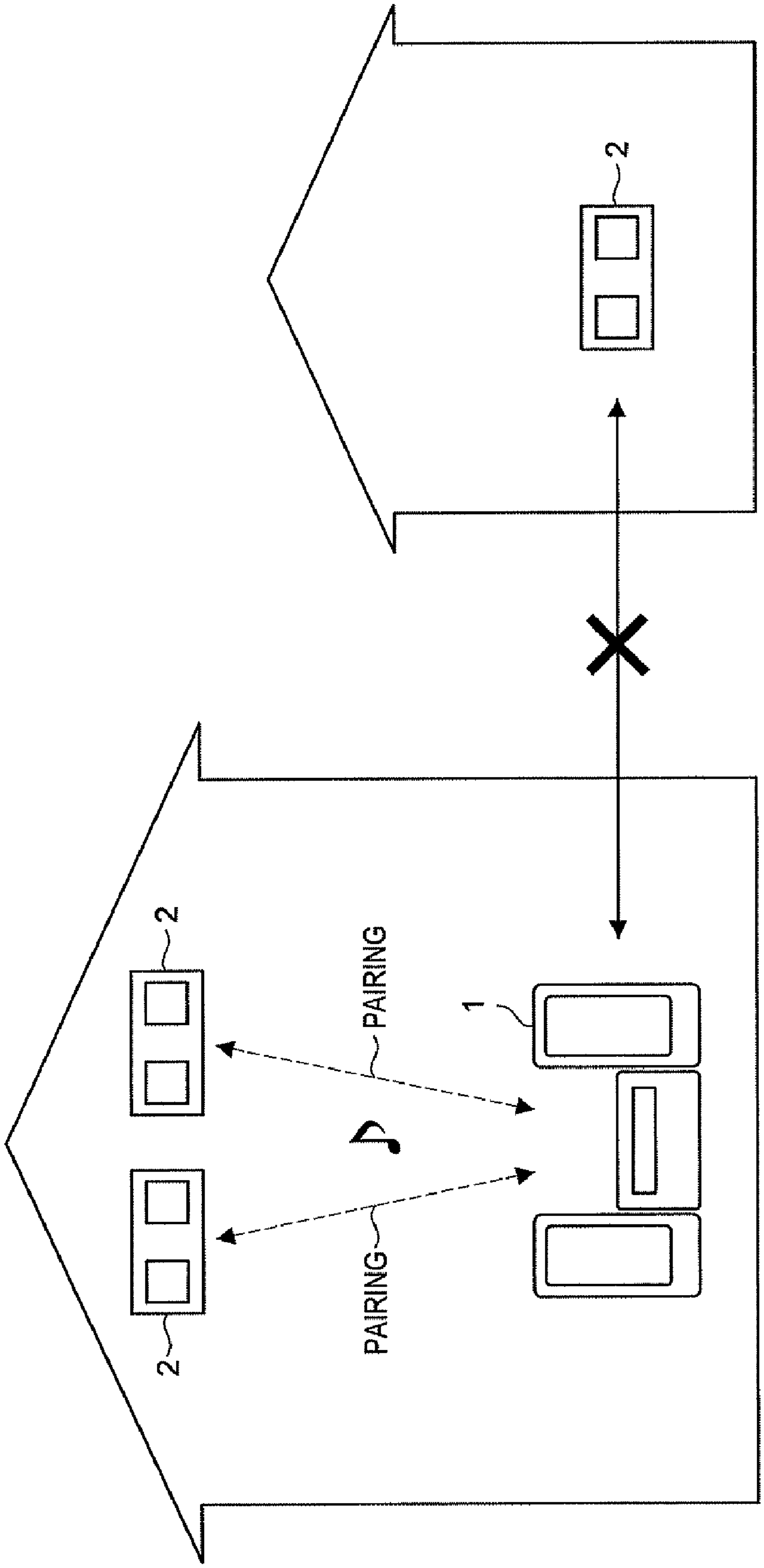
FIG. 5B is an explanatory view illustrating the pairing function in the basic technique.
Figure 5C:
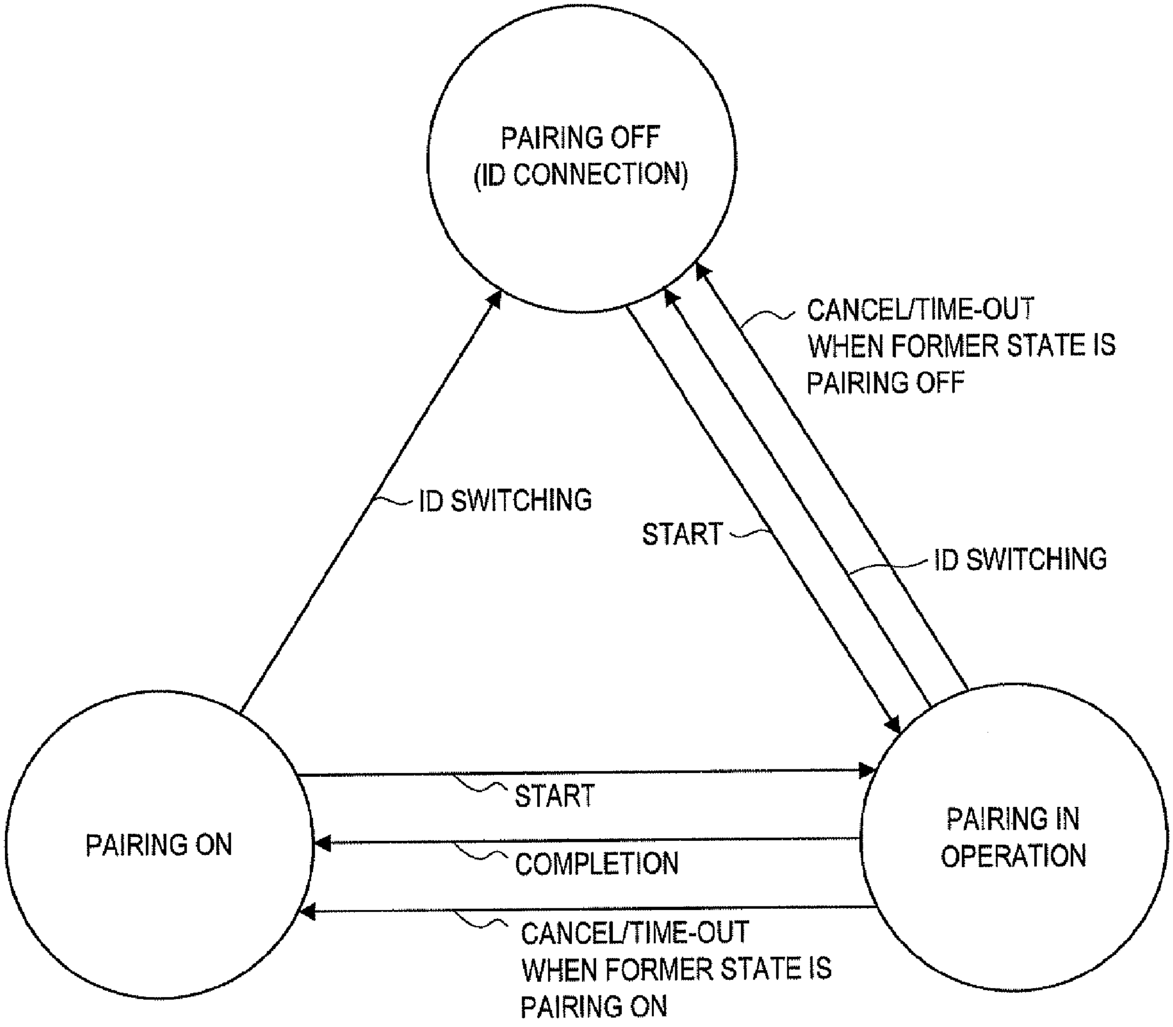
FIG. 5C is an explanatory view illustrating the pairing function in the basic technique.

The pairing function in the basic technique is described hereinafter in detail with reference to FIGS. 5A to 5C. FIGS. 5A to 5C are explanatory views illustrating the pairing function in the basic technique.

The pairing function described hereinbelow is a function that enables a link between a particular master unit and a particular slave unit in order to prevent a link with an unintended S-AIR slave unit.

In S-AIR, by setting the same S-AIR ID to the master unit and the slave unit as shown in FIGS. 4A and 4B, for example, the same range is used as a frequency range to be used for two-way communication, so that the master unit and the slave unit are connected to each other, thus enabling two-way communication.

However, if another slave unit to which the same S-AIR ID is set exists in the range where communication through S-AIR is possible, an intended connection possibly occurs as shown in FIG. 5A, for example.

With the use of the pairing function described hereinbelow, a connection is established only between the master unit and the slave unit between which pairing is established, thereby eliminating the occurrence of an unintended connection as shown in FIG. 5B, for example.

[Pairing Operation]

The pairing function described above is enabled by executing the pairing operation described hereinbelow in each of the master unit and the slave unit, so that the master unit and the slave unit can transmit and receive data with each other.

The pairing operation is conducted by manipulating a [pairing] key or a prescribed key related to menu operation when the master unit and the slave unit are in the system power-on state.

First, the S-AIR IDs of the master unit and the slave unit are set to match each other, and the master unit is set to the pairing mode by a certain means such as operating a switch or a menu, for example. Next, the pairing operation is performed in the master unit, and a connection with the slave unit is waited for a predetermined time (e.g. 5 minutes). The processing to set the pairing mode and the processing to wait for a connection with the slave unit for a predetermined time may be executed in one operation.

Then, the pairing operation is performed in the slave unit by a certain means such as operating a switch or a menu, for example. After the pairing is established as a result of prescribed processing performed by the connection control portions of the master unit and the slave unit, the master unit and the slave unit leave the pairing operation. If there are a plurality of slave units to be paired, pairing of each slave unit can be performed by repeating the above operation. The master unit can leave the pairing operation if a certain means is taken before pairing with the slave unit is established.

FIG. 5C is an example of a transition diagram of the pairing operation in S-AIR. As shown in FIG. 5C, the master unit and the slave unit make a transition among three statuses related to the pairing by prescribed operations.

[Checking of Pairing Status]

The master unit or the slave unit may display whether the master unit or the slave unit is in the pairing state or not so that a user of each unit can check it. For example, the statuses to be displayed by each unit may be three statuses: “S-AIR ID connection (i.e. the pairing off status)”, “Pairing in operation”, and “Pairing status”, for example. Such statuses may be displayed as follows using a single-color light emitting diode (LED) or a display tube segment, for example.

S-AIR ID connection: turn off the LED or the display tube segment

Pairing in operation: blink the LED or the display tube segment

Pairing state: light up the LED or the display tube segment

[Backup of the Pairing Status]

The connection control portion of at least either one of the master unit or the slave unit may store the pairing status of both the master unit and the slave unit in a storage portion inside the unit for at least 24 hours when each unit becomes the state of AC OFF or the same state as when a power cord is unplugged. Further, when the backup gets timeout, the connection control portion cancels the pairing with the stored unit and changes the setting so as to return to the S-AIR ID connection. Such a backup function eliminates the need for a user of each unit to perform frequent pairing setting.

[Canceling of Pairing]

If a prescribed operation is executed in at least either one of the master unit or the slave unit, the connection control portion cancels the pairing between the master unit and the slave unit being paired and makes a switch to the S-AIR ID connection state. This processing may be executed by switching the S-AIR ID, for example.

An example of the principal functions of the connection control portion which at least either one of the master unit or the slave unit has is described in the foregoing. The function of the connection control portion, however, is not limited to the above-described example.

<Transmission of an Audio Signal Between the Master Unit and the Slave Unit>

The functions of at least either one of a transmission control portion that is included in the master unit and composed of CPU, ROM, RAM, DSP, an external device communication portion and so on or a transmission control portion that is included in the slave unit and composed of CPU, ROM, RAM, DSP, an external device communication portion and so on are described hereinafter in detail. The transmission control portion included in the master unit and the slave unit may further include a plurality of processing portions that are specialized to each function described below.

[Modes of the Master Unit]

The master unit is in either state of the surround mode having one main channel and maximum three sub-channels as S-AIR channels or the multi-source mode having maximum four main channels as S-AIR channels. Further, the master unit notifies channel mapping to the slave unit during when establishing a link in any of the surround mode and the multi-source mode. The channel mapping is information indicating the type of the audio signal being transmitted from the master unit through each of a plurality of channels. Upon each occurrence of an event that causes a change in the channel mapping of the master unit, the master unit changes the channel mapping and notifies the changed channel mapping to the slave unit.

[Surround Mode]

The surround mode, which is one of the modes of the master unit, is described hereinafter in detail with reference to FIGS. 6A and 6B. FIGS. 6A and 6B are explanatory views illustrating the mode of the master unit in the basic technique.

The master unit in the surround mode has one main channel and maximum three sub-channels. The transmission control portion of the master unit can arbitrarily allocate the surround source of the master unit to the respective sub-channels.

In FIG. 6A, for example, the stereo output of the main channel is allocated to CH1, and 3-channel stereo sub-channels are allocated to three channels, CH2 to CH4. In the surround mode, the DVD front component (L/R component) of an audio signal is allocated to CH1 as the main channel, and three kinds of surround signals originally recorded on DVD are allocated to CH2 to CH4 as shown in FIG. 6B, for example. Further, depending on the sound field setting of the master unit, a DVD down-mixed audio signal may be allocated to the main channel, and the surround component generated in the master unit may be allocated to the sub-channels.

[Multi-Source Mode]

The multi-source mode, which is one of the modes of the master unit, is described hereinafter with reference to FIGS. 6C and 6D. FIGS. 6C and 6D are explanatory views illustrating the mode of the master unit in the basic technique.

The master unit in the multi-source mode has maximum four main channels. Further, the transmission control portion of the master unit can arbitrarily allocate the main source of the master unit to the respective S-AIR channels.

In FIG. 6C, for example, different main sources can be allocated to the four stereo channels of CH1 to CH4. In the multi-source mode, DVD down-mixed audio signals are allocated to the main channels, in which an audio signal whose sound source is CD is allocated to CH1, an audio signal whose sound source is TUNER is allocated to CH2, an audio signal whose sound source is digital media port (DMPORT) is allocated to CH3, and an audio signal whose sound source is AUDIO IN is allocated to CH4, as shown in FIG. 6D, for example.

[Kinds of Sub-Channels]

An example of the sub-channels that are used in S-AIR is described hereinafter with reference to FIG. 7. FIG. 7 is an explanatory view illustrating an example of the kinds of the sub-channels in the basic technique.

Referring to FIG. 7, the sub-channels that are allocated to the master unit in the surround mode are specified in pair of two channels. The sub-channels that are used in S-AIR are not limited to the example shown in FIG. 7, and if a new sub-channel occurs, it can be added as a sub-channel at any time.

[Audio Signal that can be Played Back by the Main Slave Unit]

The audio signal that can be played back by the main slave unit 2 is described hereinafter in detail with reference to FIG. 8A. FIG. 8A is an explanatory view illustrating the audio signal that can be played back by the main slave unit.

The main slave unit 2 is a slave unit assumed to be mainly used for the room 1 (e.g. 2nd room) that is different from the main room, and it can play back the main channel of the master unit 1. Thus, referring to FIG. 8A, if the master unit 1 to which the main slave unit 2 is connected is in the surround mode, the main slave unit 2 can acquire the audio data (audio signal) of the main channel that is allocated to CH1 by the transmission control portion and play back the main channel in CH1 only. On the other hand, if the master unit 1 to which the main slave unit 2 is connected is in the multi-source mode, the main slave unit 2 can acquire the audio data (audio signal) of the main channels that are allocated to CH1 to CH4 by the transmission control portion and play back each main channel in CH1 to CH4.

Further, although any number of main slave units can be actually connected to one main unit, the connection control portion and the transmission control portion of the master unit 1 may assure the connection of 10 main slave units.

[Audio Signal that can be Played Back by the Sub-Slave Unit]

The audio signal that can be played back by the sub-slave unit is described hereinafter in detail with reference to FIG. 8B. FIG. 8B is an explanatory view illustrating the audio signal that can be played back by the sub-slave unit.

The sub-slave unit is a slave unit assumed to be mainly used for the main room, and it can play back the sub-channel of the master unit 1. Thus, referring to FIG. 8B, the sub-slave unit can be connected only to the master unit 1 in the surround mode that is configured by the channel mapping including the sub-channels, and a link with the master unit 1 in the multi-source mode that is configured by the channel mapping not including the sub-channels may not be possible as shown in FIG. 8B.

Further, the sub-channels that can be played back by the sub-slave unit are determined according to the function which the sub-slave unit has. For example, as shown in FIG. 8B, the sub-slave unit 3 having the function of surround rear (SR) can receive an audio signal whose audio data is SR (surround rear) by the transmission control portion and play back the received audio signal. Further, the sub-slave unit 4 having the function of surround back (SRB) can receive an audio signal whose audio data is SRB (surround back) by the transmission control portion and play back the received audio signal.

The connection control portion and the transmission control portion of the master unit can limit the number of sub-slave units that can be connected one sub-channel of one master unit to a prescribed number (e.g. 2).

Although the example of the principal functions of the transmission control portion which at least either one of the master unit or the slave unit has is described above, the functions of the transmission control portion are not limited to the above example.

<Display Specifications>

The display specifications of the master unit and the slave unit in S-AIR are described hereinafter in detail. The display is executed by a display control portion included in the master unit and the slave unit and composed of CPU, ROM, RAM, DSP and so on.

[Display Specifications of the Master Unit]

The display control portion of the master unit in S-AIR may display whether the master unit and the slave unit are in the linkable state or not so that a user of the master unit can check it, regardless of the connection status of the slave unit. The statuses to be displayed on the master unit may be two, "Non-linkable status" and "Linkable status", for example. Those statuses may be displayed as follows using a single-color LED or a display tube segment, for example.

Non-linkable status: turn off the LED or the display tube segment

Linkable status: light up the LED or the display tube segment

The display control portion of the master unit in S-AIR transmits information necessary for performing display on the slave unit to the slave unit. The display control portion of the master unit transmits the model name of the master unit and may further transmit current function information, playback status, broadcast station information, track information and so on to the slave unit according to need.

[Display Specifications of the Slave Unit—Link Status]

The display control portion of the slave unit in S-AIR may display the status related to a link with the master unit so that a user of the slave unit can check it. The statuses to be displayed on the slave unit may be three, "Not linked", "Link in progress" and "Link succeeded", for example. In addition to the three statuses, the status of "Link failed" may be also displayed. Those statuses may be displayed as follows using a LED emitting prescribed colors or a display tube segment, for example.

The case of displaying the three statuses:

Not linked: turn off the single-color LED or the display tube segment

Link in progress: blink the single-color LED or the display tube segment

Link succeeded: light up the single-color LED or the display tube segment

The case of displaying the four statuses:

Not linked: turn off the two-color LED or the display tube segment

Link in progress: blink the two-color LED with a first color or blink the display tube segment in a first blinking pattern Link succeeded: light up the two-color LED with a first color or light up the display tube segment Link failed: blink the two-color LED with a second color or blink the display tube segment in a second blinking pattern

[Display Specifications of the Slave Unit—Broadcast Information, Track Information]

If there is a display portion such as a display tube in the slave unit in S-AIR, the display control portion of the slave unit may display information about the audio source of the master unit that is being listened to by way of the slave unit. As the audio source of the master unit that is being listened to by way of the slave unit may be broadcast information such as a TUNER frequency, track information such as a CD track number and an elapsed time and so on, for example.

[Display Specifications of the Slave Unit—Connection Status]

Further, the display control portion of the slave unit in S-AIR may display the reception state of a radio wave from the master unit that is received by the slave unit (i.e. the connection status with the master unit) by a certain means. For example, the display control portion may display four statuses: "Not receivable", "Sensitivity: Low", "Sensitivity: Intermediate" and "Sensitivity: High" using a fixed segment such as a display tube.

[Display Specifications of the Slave Unit—Current Function Information]

If there is a display portion such as a display tube in the slave unit, the display control portion of the slave unit in S-AIR may display the function name (input name) of the master unit that is being listened through the slave unit on the display portion. Further, if the function name of the master unit is a character string exceeding a display digit number, the function name may be displayed by scrolling. The function name of the master unit may be "CD", "DMPORT", "AUDIO IN", and so on.

[Display Specifications of the Slave Unit—Playback Status]

Furthermore, the display control portion of the slave unit in S-AIR may display the playback status such as Play or Pause on the slave unit according to the playback status of the master unit.

In addition to the displays described above, the display control portion of the slave unit in S-AIR may further display a certain warning display on the display portion.

Although the display specifications of the master unit and the slave unit in S-AIR are described in detail above, the display specifications of each unit are not limited to the above-described examples.

<Key Input Portion>

A key input portion that is placed on the master unit and the slave unit in S-AIR is described hereinafter in detail.

[Key Input Portion of the Slave Unit]

If the slave unit in S-AIR includes the key input portion as described below, it is possible to control the master unit from the slave unit. The operation when manipulating the key input portion described below on the slave unit conforms to the specifications of the master unit.

[Key Input Portion of the Slave Unit—Running Control]

The slave unit in S-AIR may include the key input portion for running control that controls the playback of the audio source in the master unit. An example of the kind of the corresponding key input portion and the operation is shown in the following Table 2:

TABLE 2

| Key | Operation |
|---|---|
| PLAY | Play back a track |
| PAUSE | Pause the currently playing track |
| STOP | Stop the currently playing track |
| AMS+ | Play back the next track |
| AMS− | Play back the previous track |
| FF | Fast-forward the currently playing track |
| FR | Fast-rewind the currently playing track |
| ALBUM+ | Play back a track in the next album |
| ALBUM− | Play back a track in the previous album |

[Key Input Portion of the Slave Unit—TUNER Control]

The slave unit in S-AIR may include the key input portion for TUNER control that controls TUNER in the master unit. An example of the kind of the corresponding key input portion and the operation is shown in the following Table 3:

TABLE 3

| Key | Operation |
|---|---|
| AMS+ | Tune in the next preset station |
| AMS− | Tune in the previous preset station |
| FF | Frequency/Channel+ |
| FR | Frequency/Channel− |

[Processing by Key Press Operation in the Slave Unit]

In the case of controlling the master unit by way of button operation in the slave unit, FF/FR key or the like is sometimes pressed in order to perform fast forwarding/fast rewinding or tuning operation. In such a case, the transmission control portion of the slave unit transmits a KEY_ON command to the master unit once per two seconds, for example, while the key is pressed, and then transmits a KEY_OFF command to the master unit in the moment at which the key is released. By such processing, the transmission control portion of the slave unit can perform playback control of the master unit.

[S-AIR Channel Switching by the Slave Unit]

Figure 9B:
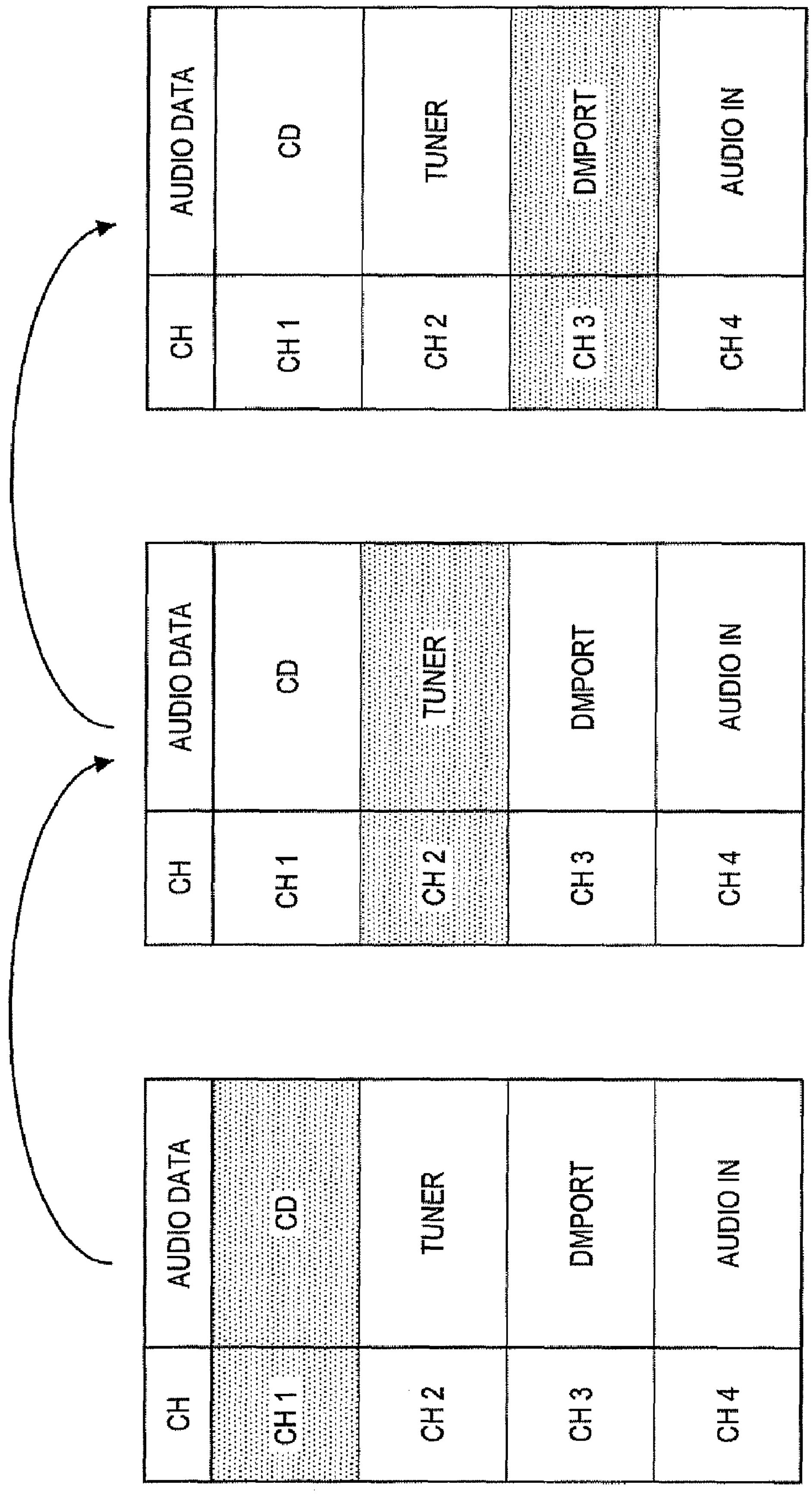
FIG. 9B is an explanatory view illustrating channel switching in the basic technique.

S-AIR channel switching by the slave unit is described hereinafter with reference to FIGS. 9A and 9B. FIGS. 9A and 9B are explanatory views illustrating channel switching in the basic technique.

The slave unit in S-AIR is capable of switching the function of the S-AIR channel to be played back or the function of the S-AIR channel being played back. Such a channel switching operation may be performed by manipulating a channel switching key (e.g. [CH] key, [CH+][CH−] key etc.) placed on the slave unit, for example.

The transmission control portion of the slave unit executes the following S-AIR channel switching processing according to the kind of the connected master unit.

In the case where the master unit to which the slave unit is connected is in the surround mode as shown in FIG. 9A, for example, the transmission control portion of the slave unit gives a notification requesting a change in the function allocated to the main channel to the transmission control portion of the master unit. Receiving the notification, the transmission control portion of the master unit generates the channel mapping in which the function input allocated to the main channel is changed and transmits the newly generated channel mapping to the salve unit. Receiving the new channel mapping, the transmission control portion of the slave unit receives an audio signal whose sound source is the new function based on the received channel mapping.

As a result of the above processing performed by the transmission control portions of the master unit and the slave unit, the channel mapping transmitted from the master unit is switched as shown in FIG. 9A. In the example shown in FIG. 9A, as a result that the channel switching key is operated in the slave unit, the function allocated to CH1 is switched from DVD to TUNER and further switched from TUNER to AUDIO IN. When the master unit is in the surround mode, the sub-channels do not basically change as shown in FIG. 9A.

On the other hand, in the case where the master unit to which the slave unit is connected is in the multi-source mode as shown in FIG. 9B, for example, the transmission control portion of the slave unit switches the channel for reception based on the channel mapping received from the master unit, and subsequently receives the audio signal of the switched channel. If the channel mapping as shown in FIG. 9B is received from the master unit, for example, the transmission control portion of the slave unit changes the channel for receiving the audio signal each time the channel switching key is operated, so that the received function is switched from CD to TUNER and further switched from TUNER to DMPORT.

[Volume Control by the Slave Unit]

The main slave unit to receive the main channel is capable of controlling the volume of the audio signal being played back. Because an audio gain transmitted from the master unit is fixed, the main slave unit has a volume control function. However, the main slave unit that does not include an amplifier may not have the volume control function.

If the volume change key (e.g. a key such as [Vol+] and [Vol−], a volume change knob etc.) placed on the slave unit is operated, the audio signal playback portion of the slave unit controls the gain of the received audio signal and adjusts the volume of the music source being played back.

[Processing in the Master Unit]

In S-AIR, if the slave unit has a running control function for CD, DVD, Blu-ray disc and so on, it is necessary for the master unit to deal with the keys shown in Tables 2 and 3 transmitted from the slave unit. Thus, the transmission control portion of the master unit controls transmission of the audio signal based on a control signal corresponding to the key operation transmitted from the slave unit. The master unit does not have to deal with the function that exists in the slave unit but does not exist in the master unit.

[Volume Control by the Master Unit]

The audio signal playback portion and the transmission control portion of the master unit are capable of controlling the volume of the audio signal being played back. If the volume change key (e.g. a key such as [Vol+] and [Vol−], a volume change knob etc.) placed on the master unit is operated, the audio signal playback portion of the master unit controls the gain of the audio signal and adjusts the volume of the music source being played back. Further, the transmission control portion adjusts an audio gain of the sub-channel transmitted to the surround slave unit and transmits it to the surround slave unit.

[S-AIR Mode]

The master unit in S-AIR is capable of switching whether to pass the same source as the main room (main function) or to pass a different source from the main room (sub-function) as music data that is transmitted as the main channel. The action of the master unit changes by such switching.

Specifically, the transmission control portion of the master unit switches whether to allocate the same audio source as the main room or a different audio source from the main room as the function to be allocated to the main channel according to an operation on a prescribed key such as [S-AIR MODE] key or [FUNCTION] key placed on the master unit. As a result of such switching processing performed by the transmission control portion, the action of the master unit changes.

[Response to Key Press Operation in the Slave Unit]

In the case of controlling the master unit by way of button operation in the slave unit, the FF/FR key or the like is sometimes pressed in order to perform fast forwarding/fast rewinding or tuning operation. Therefore, it is necessary for the transmission control portion of the master unit to perform processing corresponding to a control command signal transmitted from the slave unit.

For example, the transmission control portion of the master unit performs an operation corresponding to the key press while it receives a KEY_ON command transmitted from the slave unit at intervals of 2 seconds. On the other hand, when the transmission control portion of the master unit has not received a KEY_ON/OFF command from the slave unit for 2.5 seconds after receiving the KEY_ON command, it determines that S-AIR communication is lost for some reason and ends the operation for the command.

The transmission control portion of the master unit can deal with the key press operation in the slave unit by performing the above processing, for example.

[Response to a Control from a Plurality of Slave Units]

In S-AIR, one master unit may be controlled from a plurality of slave units simultaneously. In such a case, the action of the master unit changes depending on circumstances.

For example, in the case where the master unit is in the surround mode and the same music source is played back in the master unit and all main slave units such as the surround mode—main function, operations in the respective main slave units are sequentially accepted by the transmission control portion of the master unit, and, eventually a finally input command from the main slave unit becomes effective.

On the other hand, in the case where the master unit is in the multi-source mode and different music sources are played back in the master unit and a plurality of main slave units, operations in the respective main slave units are independent of each other in the transmission control portion of the master unit, and the transmission control portion of the master unit returns the action to the main slave unit in which the operation is performed.

[Emphasis]

In S-AIR, it is inhibited to transmit pre-emphasized data from the master unit to the slave unit. The pre-emphasized data is transmitted after it is de-emphasized by the master unit without fail. However, in the case of transmitting a source that is difficult to make determination about pre-emphasis depending on an input source, a de-emphasis processing portion of the master unit may not perform a de-emphasis function.

<Wireless Surround Speakers>

Figure 10:
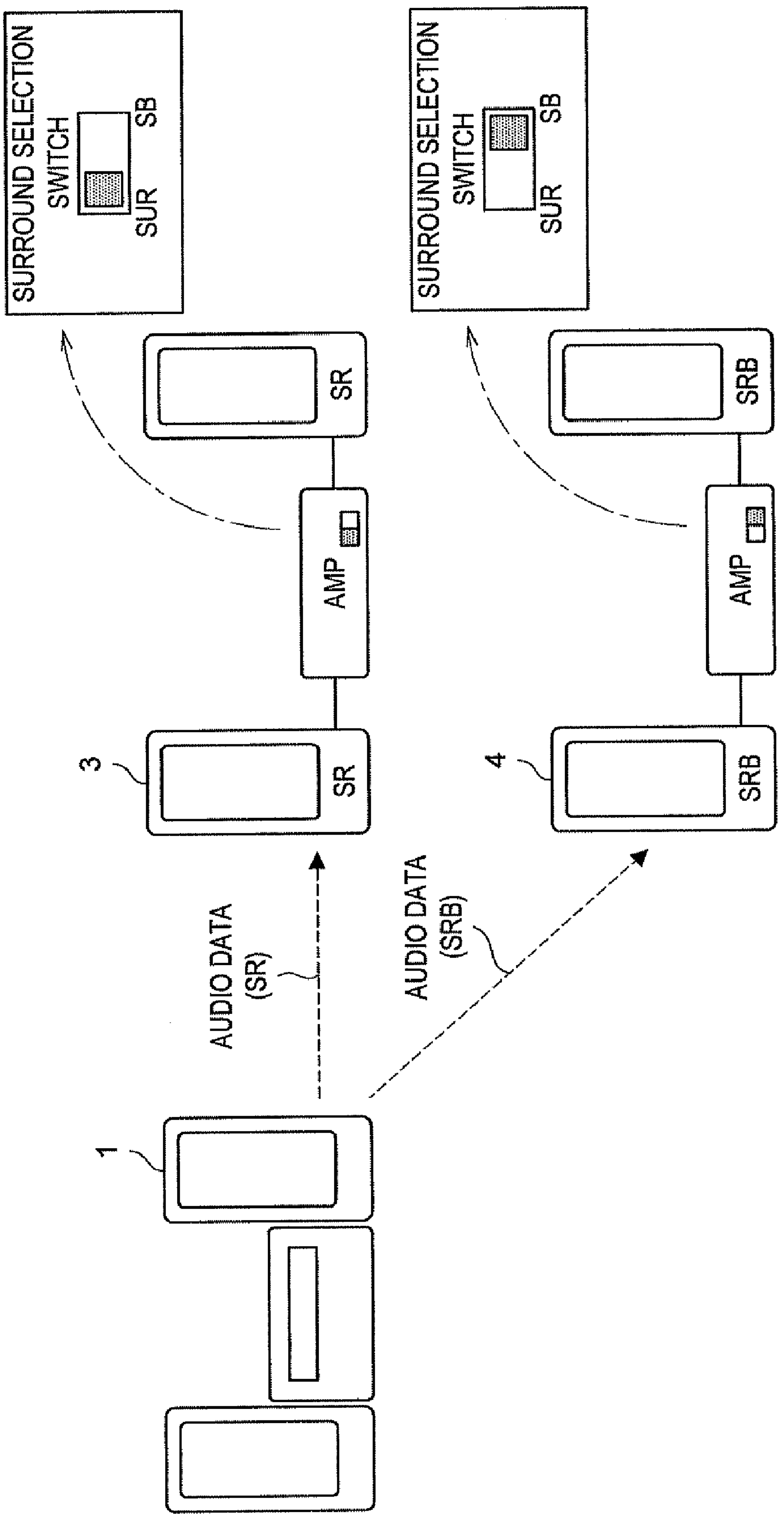
FIG. 10 is an explanatory view illustrating wireless surround speakers in the basic technique.

Wireless surround speakers that are used in S-AIR are described hereinafter in detail. In S-AIR, two kinds of speakers, a surround speaker and a surround back speaker, are used as the wireless surround speakers, for example. The wireless surround speakers used in S-AIR are described hereinbelow in detail with reference to FIG. 10. FIG. 10 is an explanatory view illustrating the wireless surround speakers in the basic technique.

[Surround Speaker]

The surround speaker that is used in S-AIR is a sub-slave unit that plays back a surround signal transmitted from the master unit. The wireless surround speaker functions as a surround speaker by selecting "SURROUND (SUR)" using a surround selection switch or the like placed on a speaker main body or an amplification portion as shown in FIG. 10.

The surround speaker outputs the surround signal received from the master unit through the speaker, and it is silent when the surround signal is not transmitted from the master unit. The playback volume of the surround speaker changes according to a volume control performed in the master unit. Specifically, the transmission control portion of the surround speaker receives a notification about a volume value of the sound source from the transmission control portion of the master unit, and the audio signal playback portion of the surround speaker plays back the acquired signal at the volume corresponding to the notified volume value.

[Surround Back Speaker]

The surround back speaker that is used in S-AIR is a sub-slave unit that plays back a surround signal transmitted from the master unit. The wireless surround speaker functions as a surround back speaker by selecting "SURROUND BACK (SB)" using a surround selection switch or the like placed on a speaker main body or an amplification portion as shown in FIG. 10.

The surround back speaker outputs the surround back signal received from the master unit through the speaker, and it is silent when the surround back signal is not transmitted from the master unit. The playback volume of the surround back speaker changes according to a volume control performed in the master unit. Specifically, the transmission control portion of the surround back speaker receives a notification about a volume value of the sound source from the transmission control portion of the master unit, and the audio signal playback portion of the surround back speaker plays back the acquired signal at the volume corresponding to the notified volume value.

[Headphones Connected to the Slave Unit]

If headphones are connected to a wireless amplifier in S-AIR, it is possible to listen to a playback sound just like when connecting the headphones the master unit.

The connection control portion of the wireless amplifier to which the headphones are connected gives a notification indicating a connection of the headphones to the connection control portion of the master unit. Receiving the notification, the connection control portion of the master unit outputs the notified information to the transmission control portion, and the transmission control portion stops speaker output of the main room. Further, the transmission control portion of the master unit changes the channel mapping. As a result, all of the speakers of the sub-slave units connected to the master unit stop output, and a sound in which all components are down-mixed is output to the headphones. It is also possible to listen to a playback sound using the headphones in the master unit and the slave unit at the same time.

The playback volume of the headphones changes according to a volume control performed in the master unit. Specifically, the transmission control portion of the wireless amplifier to which the headphones are connected receives a notification about a volume value of the sound source from the transmission control portion of the master unit, and the audio signal playback portion of the wireless amplifier plays back the acquired signal at the volume corresponding to the notified volume value.

Further, in the case where a connection of a plurality of headphones including the master unit is possible, the connection control portion of the master unit counts the number of connected headphones. If one pair or more headphones are connected, the audio signal playback portion of the master unit stops speaker output of the main room and sets the headphone output state. If all the headphones are disconnected from the unit, the audio signal playback portion of the master unit resumes speaker output.

Furthermore, when a wireless connection between the master unit and the slave unit is degraded in the state where the headphones are connected to the sub-slave unit or when the power of the slave unit comes off and a link is disconnected, the connection control portion of the master unit recognizes that the link of the slave unit is disconnected by polling and performs processing to reduce the counted number of connected headphones.

[VACS Function]

The VACS function is a function that the audio signal playback portion of the slave unit automatically controls a gain in order to suppress distortion or heat generation of the power amplifier or the speaker. First, the audio signal playback portion detects a VACS level and determines whether overflow of a processor portion is detected at a certain rate or higher per one second. If the overflow is detected at a certain rate or higher, the audio signal playback portion reduces a gain set value of the processor portion by 1 dB. The audio signal playback portion repeatedly performs such processing according to need and attenuates the gain to −18 dB at maximum. The initial value is VACS level OFF.

The VACS operation is performed independently in the slave unit and not performed in synchronization with the master unit.

<Multi-Room Playback Speaker>

The multi-room playback speaker that is used in S-AIR is described hereinafter in detail.

[Difference by the Mode of the Master Unit]

In S-AIR, an audio source that is output from the multi-room playback speaker changes according to the mode of the connected master unit. For example, if the master unit is in the surround mode, the same source is played back in any slave unit. If, on the other hand, the master unit is in the multi-source mode, the music to be played back corresponds to the source that is allocated to the S-AIR channel selected by each slave unit.

[Switching of the Source of the Master Unit]

In S-AIR, the multi-room playback speaker is capable of switching the function of the S-AIR channel being played back or the S-AIR channel to be played back. The channel switching operation may be performed by manipulating a channel switching key (e.g. [CH] key, [CH+][CH−] key etc.) placed on the multi-room playback speaker, for example.

The transmission control portion of the multi-room playback speaker executes the following S-AIR channel switching operation according to the kind of the master unit to which it is connected.

For example, in the case where the master unit to which the multi-room playback speaker is connected is in the surround mode, the transmission control portion of the multi-room playback speaker gives a notification requesting a change in the function allocated to the main channel to the transmission control portion of the master unit. Receiving the notification, the transmission control portion of the master unit generates the channel mapping in which the function input allocated to the main channel is changed and transmits the newly generated channel mapping to the multi-room playback speaker. Receiving the new channel mapping, the transmission control portion of the multi-room playback speaker receives an audio signal whose sound source is the new function based on the received channel mapping.

On the other hand, in the case where the master unit to which the multi-room playback speaker is connected is in the multi-source mode, the transmission control portion of the multi-room playback speaker switches the channel for reception based on the channel mapping received from the master unit, and subsequently receives the audio signal of the switched channel.

By the above processing, in the multi-room playback speaker, the audio source transmitted from the master unit is switched each time the S-AIR channel selection switch is operated.

[Volume Control]

The multi-room playback speaker is capable of controlling the volume of the audio signal being played back. The volume control that is made in the multi-room playback speaker does not affect the volume of the master unit. Likewise, the music that is played back by the multi-room playback speaker is not affected by the volume control made in the master unit.

If the volume change key (e.g. a key such as [Vol+] and [Vol−], a volume change knob etc.) placed on the multi-room playback speaker is operated, the audio signal playback portion of the multi-room playback speaker controls the gain of the received audio signal and adjusts the volume of the music source to be played back.

[Headphones Connected to the Slave Unit]

If headphones are connected to the multi-room playback speaker, only the connected multi-room playback speaker stops output to the speaker and performs playback through the headphones. A connection of the headphones to the multi-room playback speaker does not affect playback of the master unit and the other slave units.

Specifically, in the multi-room playback speaker to which the headphones are connected, the audio signal playback portion stops speaker output in the multi-room playback speaker. Further, the audio signal playback portion plays back the same source as the speaker output through the connected headphones. At this time, no change occurs in playback performed in the master unit and the other slave units. The volume of the audio source output from the headphones is adjusted by the volume control in the multi-room playback speaker in the same manner as before connecting the headphones.

[Gain Offset]

A gain offset value is usually added to the audio source that is transmitted from the master unit. Therefore, it is necessary for the main slave unit such as the multi-room playback speaker to play back the audio source corresponding to the offset value. Thus, the audio signal playback portion of the multi-room playback speaker adds the offset value to a sound volume adjusted by a volume control and outputs the audio source.

The audio signal transmission technique (S-AIR) that is the basic technique of the present invention is described in detail in the foregoing. The audio signal transmission system according to each embodiment of the present invention described hereinbelow is configured on the basis of the basic technique and further improved so as to offer more significant advantages.

First Embodiment

Based on the basic technique described in the foregoing, the audio signal transmission system according to the first embodiment of the present invention is described hereinafter in detail. The audio signal transmission system according to the embodiment is a system on the basis of the basic technique described above.

<Audio Signal Transmission System According to the Embodiment>

The audio signal transmission system according to the embodiment is described hereinafter in detail with reference to FIG. 11.

Figure 11:
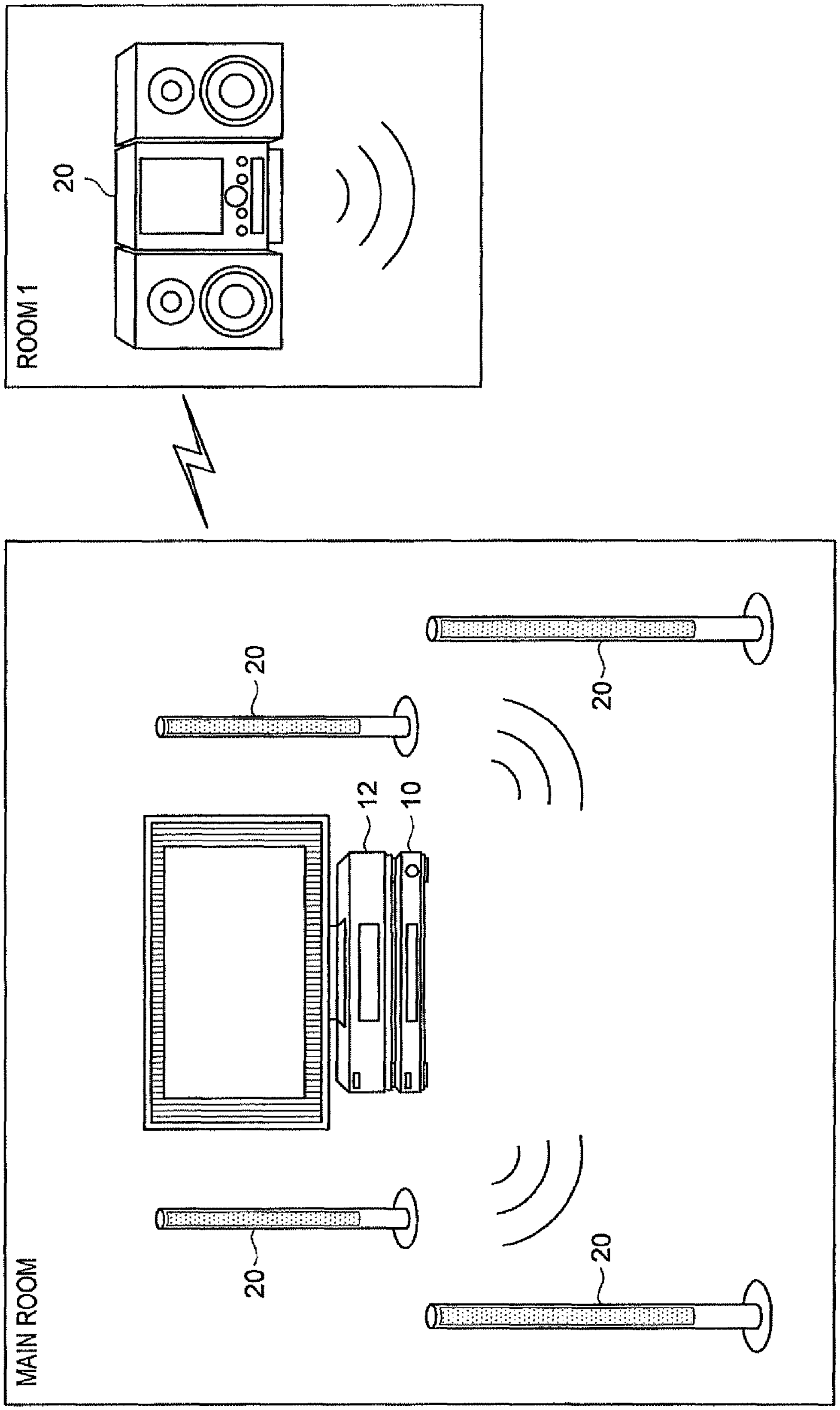
FIG. 11 is an explanatory view illustrating an audio signal transmission system according to a first embodiment of the present invention.

Referring to FIG. 11, an audio signal transmission system 5 according to the embodiment includes an audio signal transmitting apparatus 10 and an audio signal receiving apparatus 20.

The audio signal transmitting apparatus 10 wirelessly transmits an audio signal to the audio signal receiving apparatus 20 and receives various kinds of information transmitted from the audio signal receiving apparatus 20. The audio signal transmitting apparatus 10 may acquire the audio signal to be wirelessly transmitted from an audio signal output apparatus 12 such as a DVD player or a Blu-ray disc (BD) player, or the audio signal transmitting apparatus 10 may have the function of the audio signal output apparatus. The audio signal transmitting apparatus 10 and the audio signal receiving apparatus 20 perform transmission of an audio signal and two-way data communication of various kinds of information with use of a radio wave frequency band, for example. Thus, the audio signal transmitting apparatus 10 and the audio signal receiving apparatus 20 may be located in the same room or in separate rooms as shown in FIG. 11.

The audio signal receiving apparatus 20 receives the audio signal transmitted from the audio signal transmitting apparatus 10 and transmits various kinds of information such as information related to a connection of the audio signal receiving apparatus 20 and a notification requesting a change in the audio signal to be transmitted to the audio signal transmitting apparatus 10. The audio signal receiving apparatus 20 may be surround speakers that are wirelessly connected to the audio signal transmitting apparatus 10 as shown in the main room of FIG. 11, or it may be an audio signal output apparatus such as an audio component set that outputs the audio signal transmitted from the audio signal transmitting apparatus 10 as shown in the room 1 of FIG. 11. Further, the audio signal receiving apparatus 20 may be an audio signal acquiring apparatus such as headphones and earphones.

<Hardware Configuration of the Audio Signal Transmitting Apparatus 10>

Figure 12:
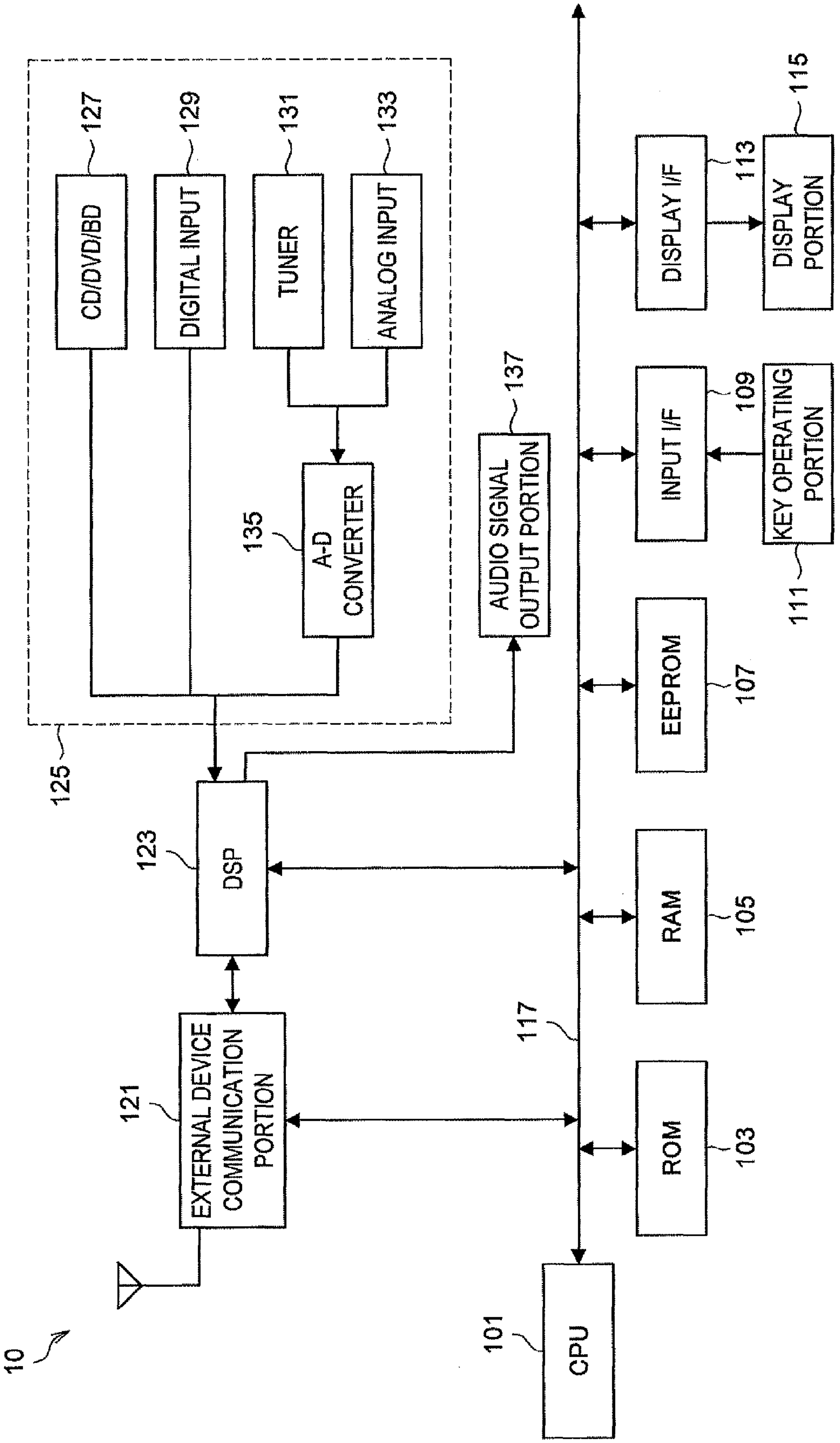
FIG. 12 is a block diagram illustrating the hardware configuration of an audio signal transmitting apparatus according to the embodiment.

The hardware configuration of the audio signal transmitting apparatus 10 according to the embodiment is described hereinafter in detail with reference to FIG. 12. FIG. 12 is a block diagram illustrating the hardware configuration of the audio signal transmitting apparatus 10 according to the embodiment.

Referring to FIG. 12, the audio signal transmitting apparatus 10 according to the embodiment includes a CPU 101, ROM 103, RAM 105, electrically erasable and programmable read only memory (EEPROM) 107, an input interface (I/F) 109, a display interface (I/F) 113, and an external device communication portion 121.

A DSP 123 is connected to the external device communication portion 121.

The CPU 101 functions as a processor and a controller, and it controls the entire or a part of the operation in the audio signal transmitting apparatus 10 according to various kinds of programs recorded in the ROM 103, the RAM 105, the EEPROM 107 and so on. The ROM 103 and the EEPROM 107 store programs and parameters to be used by the CPU 101. The RAM 105 temporarily stores programs to be used in the execution by the CPU 101, parameters that change as appropriate in the execution and so on. The ROM 103, the RAM 105 and the EEPROM 107 are connected through a host bus configured by an internal bus such as a CPU bus and a system bus 117 configured by an external bus such as a peripheral component interconnect/interface (PCI) bus.

The input interface 109 is an interface configured by an input control circuit or the like that generates an input signal based on information input by a user through a key operating portion 111 and outputs the generated input signal to the CPU 101. A user of the audio signal transmitting apparatus 10 can input various data or direct a processing operation to the audio signal transmitting apparatus 10 by operating the key operating portion 111, which is described below.

The key operating portion 111 is an operating portion that inputs various data or directs a processing operation to the audio signal transmitting apparatus 10. The key operating portion 111 is an operating means to be operated by a user, such as a mouse, a keyboard, a tough panel, a button, a switch, a lever and so on. For example, the key operating portion 111 may be a remote control means using an infrared ray or another radio wave or an externally connected device that is compatible with the operation of the audio signal transmitting apparatus 10, such as a cellular phone or a PDA.

The display interface 113 is an interface for transferring an output signal output from the CPU 101 to a display portion 115, which is described later. The display portion 115 is configured by a device capable of visually notifying various kinds of information to a user, such as a display device like a CRT display device, a liquid crystal display device, a plasma display device, an EL display device, a lamp and so on, for example.

The external device communication portion 121 is a communication interface configured by a communication device or the like for communicating with the audio signal receiving apparatus 20 and various kinds of audio signal output apparatus, for example. The external device communication portion 121 may be an interface in conformity to a general wireless audio transmission standard or an interface in conformity to a particular wireless audio transmission standard. The audio signal transmitting apparatus 10 according to the embodiment transmits an audio signal to the audio signal receiving apparatus 20 and performs two-way communication with the audio signal receiving apparatus 20 via the external device communication portion 121.

The DSP 123 is a CPU that is specialized to processing on an audio signal and an image signal. To the DSP 123, an audio signal input portion 125 to which the audio signal to be used for transmission is input and an audio signal output portion 137 from which the acquired audio signal is output are connected.

The audio signal input portion 125 is a processing portion to which the audio signal to be used for transmission by the audio signal transmitting apparatus 10 according to the embodiment is input. The audio signal input portion 125 includes a CD/DVD/BD 127, a digital input 129 to which a digital device such as a mini disk (MD) is connected, a tuner 131, an analog input 133 to which an analog device such as a cassette tape and a record is connected, and so on, for example. The audio signal that is input through the tuner 131 and the analog input 133 is converted from an analog signal to a digital signal by an A-D converter 135. The audio signal input through the audio signal input portion 125 is transmitted to the audio signal receiving apparatus 20 via the DSP 123 and the external device communication portion 121.

The audio signal output portion 137 is a processing portion that outputs the audio signal input through the audio signal input portion 125 to the outside of the audio signal transmitting apparatus 10. The audio signal output portion 137 includes a D-A converter (not shown) that converts the audio signal, which is a digital signal, to an analog signal, an amplification portion (not shown) that amplifies the converted analog audio signal, a speaker (not shown) that outputs the amplified audio signal, and so on, for example.

In addition to the elements described above, the audio signal transmitting apparatus 10 according to the embodiment may further include a storage device (not shown), a drive (not shown) and so on, for example.

The storage device is a device for data storage that is configured as an example of a storage portion of the audio signal transmitting apparatus 10 according to the embodiment. For example, the storage device may be a magnetic storage device such as a hard disk drive (HDD), a semiconductor storage device, an optical storage device, a magneto-optical storage device, or the like. The storage device is capable of storing programs to be executed by the CPU 101, various kinds of data, an audio signal acquired from the outside and so on.

The drive is a storage medium reader/writer, and it is built in the audio signal transmitting apparatus 10 or externally attached thereto. The drive reads information recorded in removable recording media such as a magnetic disk, an optical disk, a magneto-optical disk or semiconductor memory attached thereto and outputs the information to the RAM 105. The drive is also capable of writing data into removable recording media such as a magnetic disk, an optical disk, a magneto-optical disk or semiconductor memory attached thereto. For example, the removable recording media may be DVD media, HD-DVD media, Blu-ray media, compact flash (CF) (registered trademark), memory stick, secure digital (SD) memory card or the like. Further, the removable recording media may be an integrated circuit (IC) card with a contactless IC chip, electronic equipment or the like, for example.

With the configuration described above, the audio signal transmitting apparatus 10 is capable of acquiring audio signals from a variety of audio signal output sources and further transmitting the audio signals to the audio signal receiving apparatus 20 and performing two-way data communication with the audio signal receiving apparatus 20 via the external device communication portion 121.

An example of the hardware configuration that can implement the functions of the audio signal transmitting apparatus 10 according to the embodiment is described in the foregoing. Each of the above-described elements may be configured using a general-purpose member or may be configured by hardware specialized to the function of each element. It is thereby possible to change the hardware configuration to use as necessary according to the technique level when implementing the embodiment.

<Hardware Configuration of the Audio Signal receiving Apparatus 20>

Figure 13:
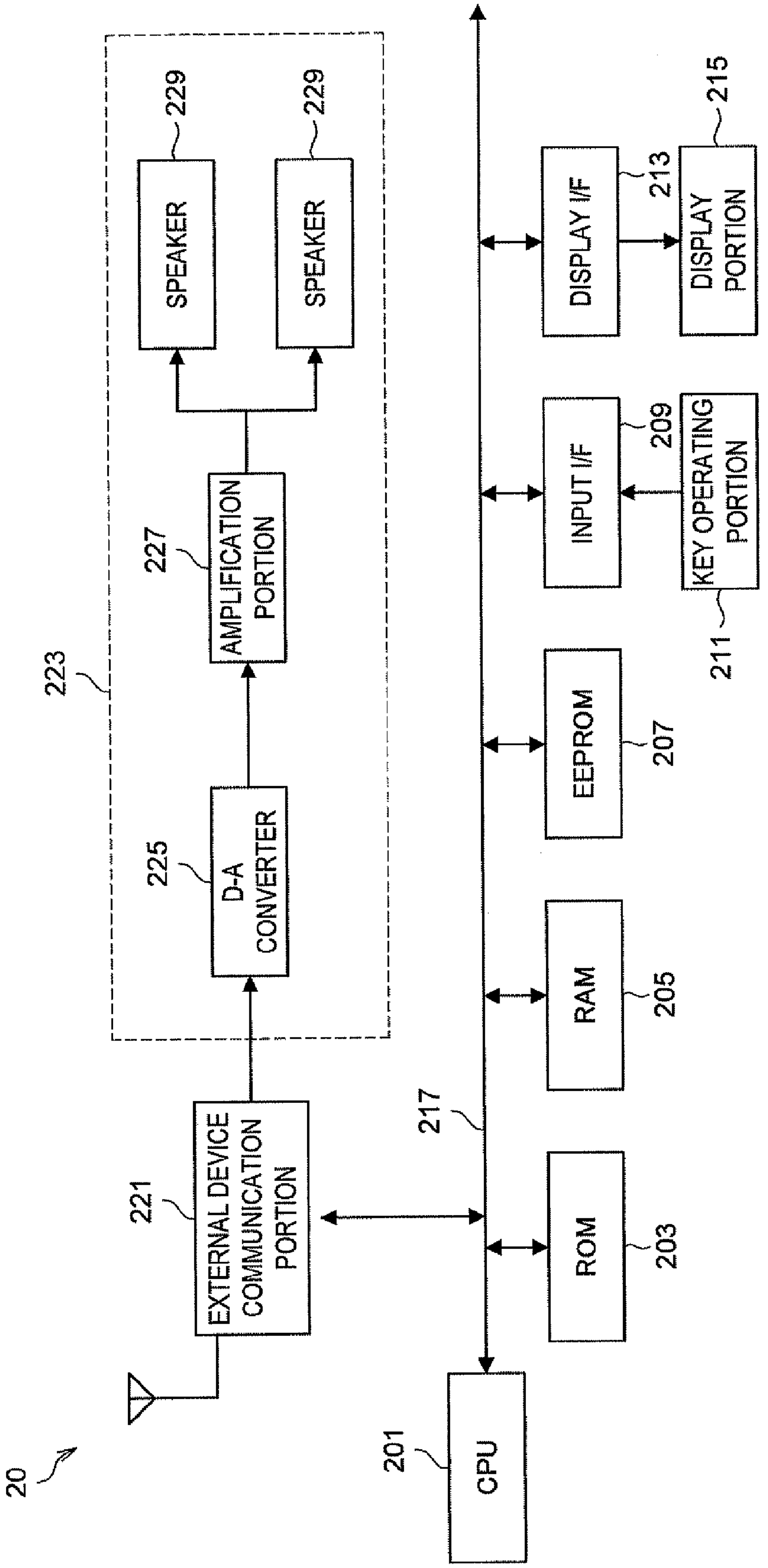
FIG. 13 is a block diagram illustrating the hardware configuration of an audio signal receiving apparatus according to the embodiment.

The hardware configuration of the audio signal receiving apparatus 20 according to the embodiment is described hereinafter in detail with reference to FIG. 13. FIG. 13 is a block diagram illustrating the hardware configuration of the audio signal receiving apparatus 20 according to the embodiment.

Referring to FIG. 13, the audio signal receiving apparatus 20 according to the embodiment includes a CPU 201, ROM 203, RAM 205, EEPROM 207, an input interface (I/F) 209, a display interface (I/F) 213, and an external device communication portion 221.

To the external device communication portion 221, an audio signal output portion 223 that outputs the received audio signal is connected.

The CPU 201 functions as a processor and a controller, and it controls the entire or a part of the operation in the audio signal receiving apparatus 20 according to various kinds of programs recorded in the ROM 203, the RAM 205, the EEPROM 207 and so on. The ROM 203 and the EEPROM 207 store programs and parameters to be used by the CPU 201. The RAM 205 temporarily stores programs to be used in the execution by the CPU 201, parameters that change as appropriate in the execution and so on. The ROM 203, the RAM 205 and the EEPROM 207 are connected through a host bus configured by an internal bus such as a CPU bus and a system bus 217 configured by an external bus such as a PCI bus.

The input interface 209 is an interface configured by an input control circuit or the like that generates an input signal based on information input by a user through a key operating portion 211 and outputs the generated input signal to the CPU 201. A user of the audio signal receiving apparatus 20 can input various data or direct a processing operation to the audio signal receiving apparatus 20 by operating the key operating portion 211, which is described below.

The key operating portion 211 is an operating portion that inputs various data or directs a processing operation to the audio signal receiving apparatus 20. The key operating portion 211 is an operating means to be operated by a user, such as a mouse, a keyboard, a tough panel, a button, a switch, a lever and so on. For example, the key operating portion 211 may be a remote control means using an infrared ray or another radio wave or an externally connected device that is compatible with the operation of the audio signal receiving apparatus 20, such as a cellular phone or a PDA.

The display interface 213 is an interface for transferring an output signal output from the CPU 201 to a display portion 215, which is described later. The display portion 215 is configured by a device capable of visually notifying various kinds of information to a user, such as a display device like a CRT display device, a liquid crystal display device, a plasma display device, an EL display device, a lamp and so on, for example.

The external device communication portion 221 is a communication interface configured by a communication device or the like for communicating with the audio signal transmitting apparatus 10 and various kinds of audio signal output apparatus, for example. The external device communication portion 221 may be an interface in conformity to a general wireless audio transmission standard or an interface in conformity to a particular wireless audio transmission standard. The audio signal receiving apparatus 20 according to the embodiment receives the audio signal from the audio signal transmitting apparatus 10 and performs two-way communication with the audio signal transmitting apparatus 10 via the external device communication portion 221.

The audio signal output portion 223 is a processing portion that outputs the audio signal transmitted from the audio signal transmitting apparatus 10. The audio signal output portion 223 includes a D-A converter 225, an amplification portion 227 and a speaker 229 as shown in FIG. 13.

The D-A converter 225 converts the received audio signal from a digital signal to an analog signal. The converted analog audio signal is amplified by the amplification portion 227 and output from the speaker 229.

The audio signal receiving apparatus 20 according to the embodiment may include a DSP and an audio signal input portion, which are included in the audio signal transmitting apparatus 10 according to the embodiment. In addition to the elements described above, the audio signal receiving apparatus 20 may further include a storage device (not shown), a drive (not shown) and so on.

The storage device is a device for data storage that is configured as an example of a storage portion of the audio signal receiving apparatus 20 according to the embodiment. For example, the storage device may be a magnetic storage device such as a hard disk drive (HDD), a semiconductor storage device, an optical storage device, a magneto-optical storage device or the like. The storage device is capable of storing programs to be executed by the CPU 201, various kinds of data, an audio signal acquired from the outside and so on.

The drive is a storage medium reader/writer, and it is built in the audio signal receiving apparatus 20 or externally attached thereto. The drive reads information recorded in removable recording media such as a magnetic disk, an optical disk, a magneto-optical disk or semiconductor memory attached thereto and outputs the information to the RAM 205. The drive is also capable of writing data into removable recording media such as a magnetic disk, an optical disk, a magneto-optical disk or semiconductor memory attached thereto. For example, the removable recording media may be DVD media, HD-DVD media, Blu-ray media, compact flash (registered trademark), memory stick, SD memory card or the like. Further, the removable recording media may be an IC card with a contactless IC chip, electronic equipment or the like, for example.

With the configuration described above, the audio signal receiving apparatus 20 is capable of acquiring audio signals from the audio signal transmitting apparatus 10 and performing two-way data communication with the audio signal transmitting apparatus 10 via the external device communication portion 221.

An example of the hardware configuration that can implement the functions of the audio signal receiving apparatus 20 according to the embodiment is described in the foregoing. Each of the above-described elements may be configured using a general-purpose member or may be configured by hardware specialized to the function of each element. It is thereby possible to change the hardware configuration to use as necessary according to the technique level when implementing the embodiment.

<Configuration of the Audio Signal Transmitting Apparatus 10>

Figure 14:
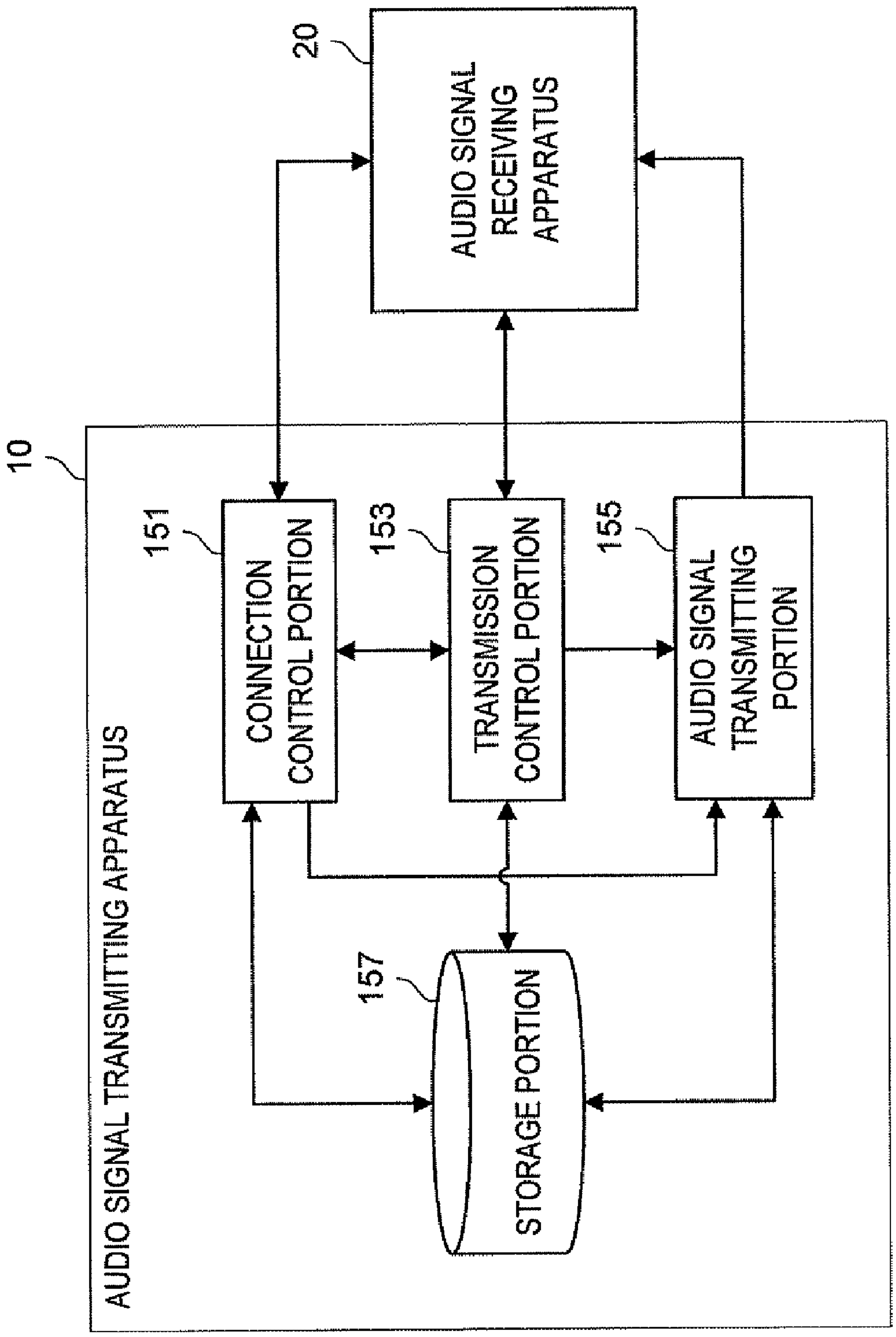
FIG. 14 is a block diagram illustrating the configuration of the audio signal transmitting apparatus according to the embodiment.

The configuration of the audio signal transmitting apparatus 10 according to the embodiment is described hereinafter in detail with reference to FIG. 14. FIG. 14 is a block diagram illustrating the audio signal transmitting apparatus 10 according to the embodiment.

The audio signal transmitting apparatus 10 according to the embodiment mainly includes a connection control portion

151, a transmission control portion 153, an audio signal transmitting portion 155, a storage portion 157 as shown in FIG. 14, for example.

The connection control portion 151 includes a CPU, ROM, RAM, EEPROM, an external device communication portion and so on, and it controls a connection of externally connected equipment such as the audio signal receiving apparatus 20 that is connected to the audio signal transmitting apparatus 10. When the connection control portion 151 receives a request for establishing a connection that is transmitted from externally connected equipment such as the audio signal receiving apparatus 20, the connection control portion 151 determines whether the connection is possible, and if it determines that the connection can be established, it establishes a connection with the externally connected equipment. Further, when the connection control portion 151 receives a request for releasing a connection that is transmitted from externally connected equipment such as the audio signal receiving apparatus 20, the connection control portion 151 releases the connection with the relevant audio signal receiving apparatus 20. Further, the connection control portion 151 grasps the number of externally connected equipment that can be connected to the audio signal transmitting apparatus 10 and the operating status based on operating status information related to the operation status of the receiving apparatus and performs a connection control.

Specifically, the connection control portion 151 controls a connection of externally connected equipment according to the presence or absence of externally connected equipment (e.g. the audio signal receiving apparatus 20 according to the embodiment, externally connected equipment such as headphones connected to the audio signal transmitting apparatus 10 and/or the audio signal receiving apparatus 20 etc.) that can be connected to the audio signal transmitting apparatus 10 and the operating status.

In addition to the above processing, the connection control portion 151 according to the embodiment can further execute the processing as the connection control portion that is included in the master unit according to the basic technique of the present invention.

The transmission control portion 153 includes a CPU, ROM, RAM, EEPROM, an external device communication portion and so on, and it controls transmission of an audio signal between the audio signal transmitting apparatus 10 and the audio signal receiving apparatus 20. Specifically, the transmission control portion 153 generates new CH mapping information (channel mapping information) in response to a request from the connection control portion 151. At the time of generating new CH mapping information, the transmission control portion 153 dynamically generates the CH mapping information so as to reflect a change in the connection status of the audio signal receiving apparatus 20 and various requests from the audio signal receiving apparatus 20 as externally connected equipment by referring to various kinds of databases stored in the storage portion 157, which is described later, various information transmitted from the connection control portion 151 and so on, for example. The newly generated CH mapping information is output to the audio signal transmitting portion 155, which is described later, and also transmitted to the audio signal receiving apparatus 20. Further, the newly generated CH mapping information may be recorded in the storage portion 157.

The transmission control portion 153 transmits sound source information containing sound source type information indicating the sound source type of the audio signal being transmitted through each of a plurality of channels and externally connected equipment playback sound source information indicating the sound source type of the audio signal being played back in externally connected equipment to the audio signal receiving apparatus 20.

In addition to the above processing, the transmission control portion 153 according to the embodiment can further execute the processing as the transmission control portion that is included in the master unit according to the basic technique of the present invention.

The audio signal transmitting portion 155 includes a CPU, ROM, RAM, EEPROM, DSP, an external device communication portion and so on, and it distributes the audio signal to each channel based on the channel (CH) mapping information transmitted from the transmission control portion 153 and transmits the audio signal to the audio signal receiving apparatus 20. Further, if it is necessary to make a conversion of the audio signal to be transmitted so as to fit the type of the audio signal (the attribute of the audio signal) in each channel described in the CH mapping information, the audio signal transmitting portion 155 performs prescribed conversion processing on the audio signal to be transmitted and then transmits the converted audio signal. If the audio signal before conversion is an audio signal corresponding to the 5.1 channel, for example, the conversion processing is down-mixing to a normal 2-channel audio signal.

The audio signal to be transmitted from the audio signal transmitting portion 155 may be acquired from the audio signal output apparatus 12 connected to the audio signal transmitting apparatus 10, or it may be an audio signal recorded in the storage portion 157, which is described later.

The storage portion 157 is a storage device that is included in the audio signal transmitting apparatus 10 according to the embodiment. For example, the storage portion 157 stores a database in which the type of the audio signal forming the CH mapping information or the like is recorded, various kinds of transmission information that is possibly transmitted to the audio signal receiving apparatus 20, various kinds of programs and processing methods to be used by the audio signal transmitting apparatus 10 of the embodiment, and so on. The storage portion 157 may record the audio signal itself.

In addition to the above-described database and programs, the storage portion 157 may store various parameters, the progress of processing or the like that are necessary to be stored when the audio signal transmitting apparatus 10 performs processing of some kind according to need. The processing portions that constitute the audio signal transmitting apparatus 10, such as the connection control portion 151, the transmission control portion 153 and the audio signal transmitting portion 155, can freely read and write information in the storage portion 157.

In addition to the above-described processing portions, the audio signal transmitting apparatus 10 may include other processing portions such as a display control portion and a display portion. In the audio signal transmitting apparatus 10 according to the embodiment, transmission of an audio signal to externally connected equipment and two-way communication with externally connected equipment may be performed via wireless transmission or wired transmission, although wireless transmission is preferred.

An example of the functions of the audio signal transmitting apparatus 10 according to the embodiment is described in the foregoing. Each of the above-described elements may be configured using a general-purpose member or circuit, or it may be configured by hardware specialized to the function of each element. Further, the function of each element may be entirely realized by CPU or the like. It is thereby possible to change the configuration to use as necessary according to the technique level when implementing the embodiment.

<Configuration of the Audio Signal Receiving Apparatus 20>

Figure 15:
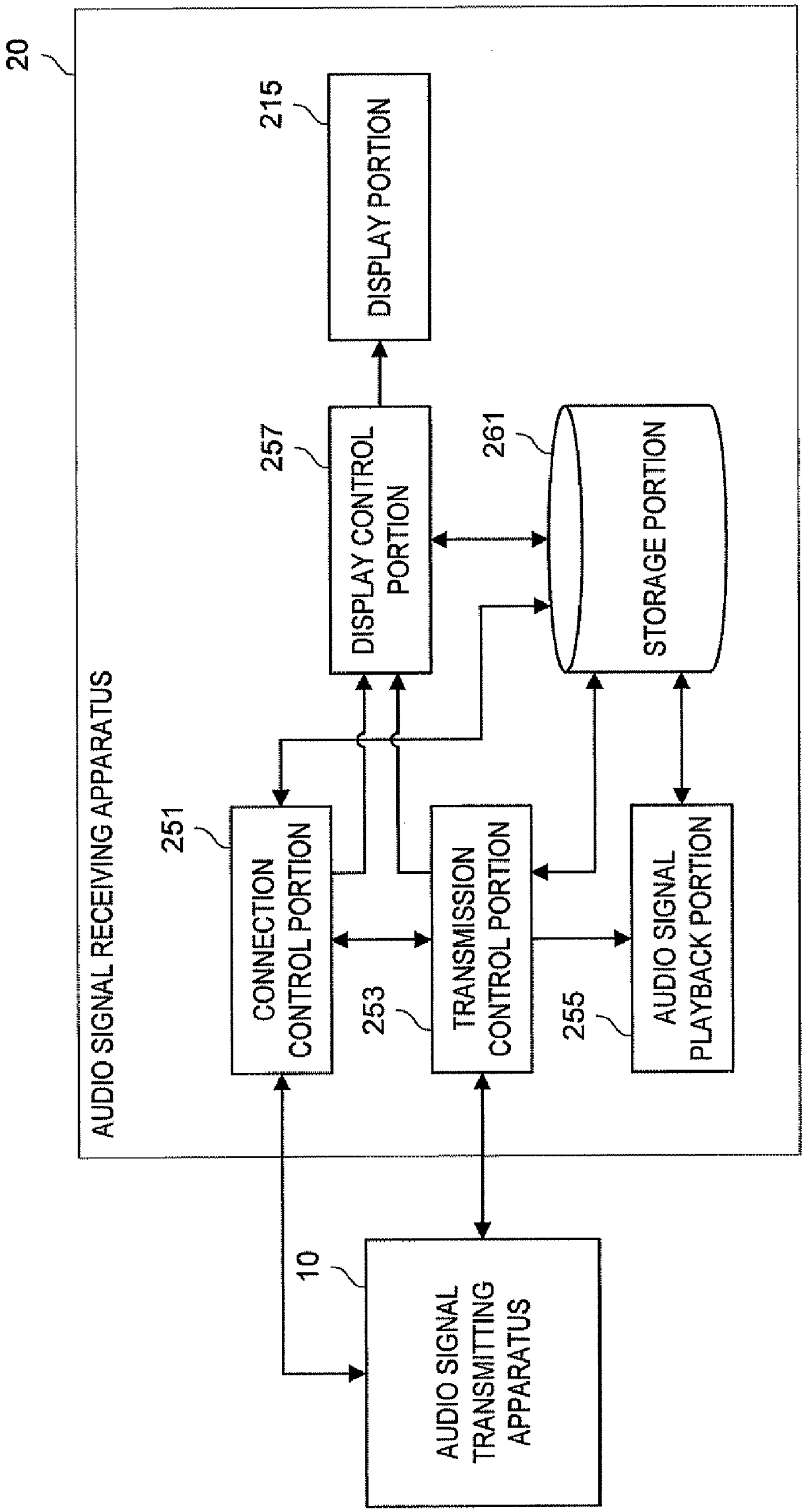
FIG. 15 is a block diagram illustrating the configuration of the audio signal receiving apparatus according to the embodiment.
Figure 16:
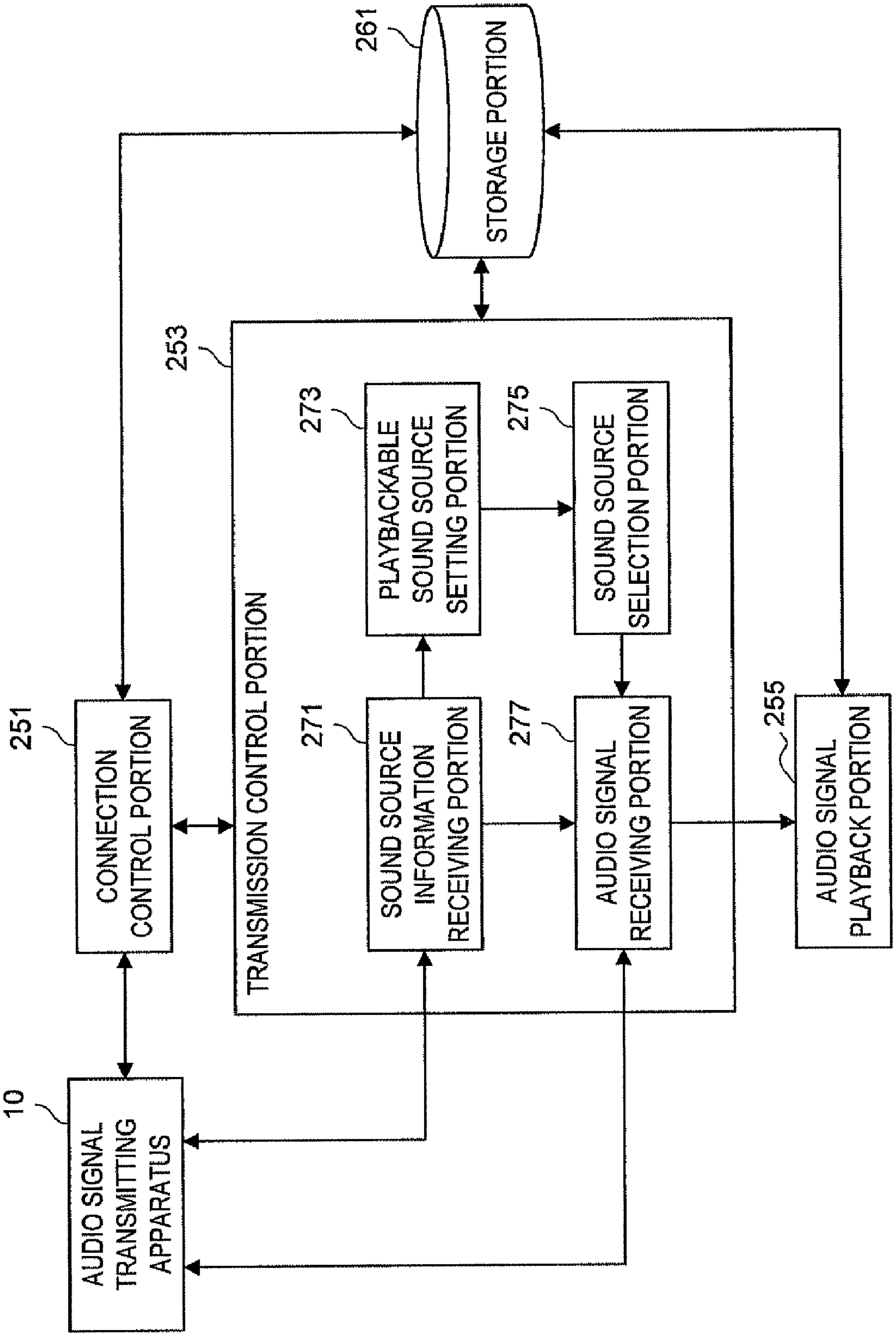
FIG. 16 is a block diagram illustrating the configuration of the audio signal receiving apparatus according to the embodiment.

The configuration of the audio signal receiving apparatus 20 according to the embodiment is described hereinafter in detail with reference to FIGS. 15 and 16. FIGS. 15 and 16 are block diagrams illustrating the configuration of the audio signal receiving apparatus 20 according to the embodiment.

The audio signal receiving apparatus 20 according to the embodiment mainly includes a connection control portion 251, a transmission control portion 253, an audio signal playback portion 255, a display control portion 257 and a storage portion 261 as shown in FIG. 15, for example.

The connection control portion 251 includes a CPU, ROM, RAM, EEPROM, an external device communication portion and so on, and it controls a connection between the audio signal receiving apparatus 20 and the audio signal transmitting apparatus 10. Specifically, the connection control portion 251 transmits connection information for changing the connection state between the audio signal receiving apparatus 20 and the audio signal transmitting apparatus 10 to the audio signal transmitting apparatus 10. The connection information for changing the connection state may be a request for establishing a connection with the audio signal receiving apparatus 20 to the audio signal transmitting apparatus 10, a request for releasing a connection with the audio signal receiving apparatus 20 to the audio signal transmitting apparatus 10, information notifying the power on/off state of the audio signal receiving apparatus 20, and so on, for example.

When the connection control portion 251 transmits the above-described connection information to the audio signal transmitting apparatus 10, it may also transmit an identifier or the like that identifies the audio signal receiving apparatus 20.

In addition to the above processing, the connection control portion 251 according to the embodiment can further execute the processing as the connection control portion that is included in the main slave unit according to the basic technique of the present invention.

The transmission control portion 253 includes a CPU, ROM, RAM, EEPROM, an external device communication portion and so on, and it controls reception of the audio signal transmitted from the audio signal transmitting apparatus 10. Further, when controlling the audio signal transmitting apparatus 10 from the audio signal receiving apparatus 20, the transmission control portion 253 controls transmission of various kinds of transmission commands to the audio signal transmitting apparatus 10. The transmission control portion 253 is described in further detail later.

In addition to the above processing, the transmission control portion 253 according to the embodiment can further execute the processing as the transmission control portion that is included in the main slave unit according to the basic technique of the present invention.

The audio signal playback portion 255 includes a CPU, ROM, RAM, EEPROM, DSP, an external device communication portion and so on, and it plays back the audio signal transmitted from the audio signal transmitting apparatus 10 and acquired by the transmission control portion 253. When playing back the audio signal, the audio signal playback portion 255 can perform volume control and running control of the audio signal. Further, when playing back the audio signal, the audio signal playback portion 255 may refer to a database recorded in the storage portion 261, which is described later.

In addition to the above processing, the audio signal playback portion 255 according to the embodiment can further perform the processing which the main slave unit according to the basic technique of the present invention can execute during playback of the audio signal.

The display control portion 257 performs display control when displaying various information transmitted from the connection control portion 251 and the transmission control portion 253 on a display portion 215 included in the audio signal receiving apparatus 20. Examples of the information to be displayed on the display portion 215 by the connection control portion 251 and the transmission control portion 253 are information indicating the link status or the connection status with the audio signal transmitting apparatus 10 as the master unit, information related to the type and the playback status of the audio signal received from the audio signal transmitting apparatus 10, broadcast station information and track information regarding playback in the audio signal receiving apparatus 20, and so on. The display control portion 257 may refer to a database recorded in the storage portion 261, which is described later, when controlling the display on the display portion 215.

Further, the display control portion 257 can perform display control when displaying information that is necessary to be displayed by the audio signal receiving apparatus 20, in addition to the above-described information, on the display portion 215. Furthermore, in addition to the above processing, the display control portion 257 according to the embodiment can further execute the processing as the display control portion that is included in the main slave unit according to the basic technique of the present invention.

The storage portion 261 is a storage device that is included in the audio signal receiving apparatus 20 according to the embodiment, and it stores a database in which the type of the audio signal forming the CH mapping information or the like is recorded, various transmission information that is possibly transmitted to the audio signal transmitting apparatus 10, various kinds of programs and processing methods to be used by the audio signal receiving apparatus 20 of the embodiment, and so on.

In addition to the above-described database and programs, the storage portion 261 can store various parameters, the progress of processing or the like that are necessary to be stored when the audio signal receiving apparatus 20 performs processing of some kind according to need. The processing portions that constitute the audio signal receiving apparatus 20, such as the connection control portion 251, the transmission control portion 253, the audio signal playback portion 255 and the display control portion 257, can freely read and write information in the storage portion 261.

[Configuration of the Transmission Control Portion 253]

The transmission control portion 253 according to the embodiment is described hereinafter in detail with reference to FIG. 16. FIG. 16 is a block diagram illustrating the functions of the transmission control portion 253 according to the embodiment.

The transmission control portion 253 according to the embodiment includes a sound source information receiving portion 271, a playbackable sound source setting portion 273, a sound source selection portion 275 and an audio signal receiving portion 277, as shown in FIG. 16.

The sound source information receiving portion 271 includes a CPU, ROM, RAM, EEPROM, DSP, an external device communication portion and so on, and it receives sound source information containing sound source type information indicating the sound source type of the audio signal being transmitted through each of a plurality of channels and externally connected equipment playback sound source information indicating the sound source type of the audio signal being played back by the audio signal transmitting apparatus 10, which is externally connected equipment, from the audio signal transmitting apparatus 10. When receiving the sound source information, the sound source information receiving portion 271 may use a database or the like recorded in the storage portion 261.

The sound source type information is information indicating the type of the audio signal transmitted from the audio signal transmitting apparatus 10 through a plurality of channels. The audio signal transmitted through each channel corresponds to each sound source which the audio signal transmitting apparatus 10 has. The sound source type information is similar to the channel mapping according to the basic technique of the present invention, and by referring to the sound source type information, the audio signal receiving apparatus 20 can be informed of the type of the mode (i.e. the surround mode or the multi-source mode) of the audio signal transmitting apparatus 10 as the master unit and the type of the sound source transmitted through each channel.

The externally connected equipment playback sound source information is information indicating the type of the audio signal being played back by the audio signal transmitting apparatus 10 that is the master unit to which the audio signal receiving apparatus 20 is connected, and it changes each time the sound source being played back by the audio signal transmitting apparatus 10 as the master unit changes. By acquiring the externally connected equipment playback sound source information, the audio signal receiving apparatus 20 can grasp the kind of the sound source which the audio signal transmitting apparatus 10 is playing back.

The audio signal transmitting apparatus 10 may transmit information related to the currently playing sound source as the externally connected equipment playback sound source information to the audio signal receiving apparatus 20 each time the kind of the sound source which it plays back changes, or it may transmit information related to the currently playing sound source as the externally connected equipment playback sound source information to the audio signal receiving apparatus 20 at predetermined time intervals. Further, the audio signal transmitting apparatus 10 may transmit information related to the currently playing sound source as the externally connected equipment playback sound source information to the audio signal receiving apparatus 20 in response to a request for acquiring the externally connected equipment playback sound source information that is transmitted from the sound source information receiving portion 271 of the audio signal receiving apparatus 20.

The sound source information receiving portion 271 transmits the received sound source type information to the audio signal receiving portion 277, which is described later, and transmits the received sound source type information and the externally connected equipment playback sound source information to the playbackable sound source setting portion 273, which is also described later. Further, the sound source information receiving portion 271 may record the received sound source information in the storage portion 261.

The playbackable sound source setting portion 273 includes a CPU, ROM, RAM, EEPROM, DSP, an external device communication portion and so on, and it sets the sound source that can be played back by the audio signal receiving apparatus 20 based on the sound source type information transmitted from the sound source information receiving portion 271. Further, the playbackable sound source setting portion 273 sets the sound source of the audio signal being played back by the audio signal transmitting apparatus 10, which is externally connected equipment, to a playbackable sound source as the externally connected equipment playback sound source based on the externally connected equipment playback sound source information transmitted from the sound source information receiving portion 271. In the following description, the externally connected equipment playback sound source is referred to as a "main unit function", and the sound source that can be played back by the audio signal receiving apparatus 20 is referred to as a "sub-function".

Specifically, the playbackable sound source setting portion 273 according to the embodiment not only sets the sound source (i.e. TUNER such as DVD, CD, AM and FM or a function such as XM, DMPORT and AUDIO IN) corresponding to the audio signal allocated to the main channel as a playbackable sound source based on the sound source type information transmitted from the sound source information receiving portion 271 but also adds a sound source called the main unit function to the playbackable sound source.

The processing to set the playbackable sound source performed by the playbackable sound source setting portion 273 is described in further detail later.

The sound source selection portion 275 selects the sound source to be played back by the audio signal receiving apparatus 20 from the playbackable sound sources set by the playbackable sound source setting portion 273. Specifically, if the playbackable sound source is selected by a user through an input device such as an operating key or a toggle placed on the audio signal receiving apparatus 20, the sound source selection portion 275 determines that the corresponding sound source is selected and requests the audio signal receiving portion 277, which is described later, to acquire the audio signal corresponding to the sound source selected by the sound source selection portion 275.

The audio signal receiving portion 277 includes a CPU, ROM, RAM, EEPROM, an external device communication portion and so on, and it receives the audio signal corresponding to the sound source that is selected by the sound source selection portion 275 based on the sound source type information transmitted from the sound source information receiving portion 271 from the audio signal transmitting apparatus 10. Specifically, the audio signal receiving portion 277 searches for the channel through which the audio signal corresponding to the sound source notified from the sound source selection portion 275 is transmitted based on the CH mapping contained in the sound source type information received by the sound source information receiving portion 271, and receives the relevant audio signal from the audio signal transmitting apparatus 10 according to the search result. Then, the audio signal receiving portion 277 outputs the received audio signal to the audio signal playback portion 255. Further, the audio signal receiving portion 277 may record the received audio signal in the storage portion 261.

The transmission control portion 253 according to the embodiment is described in detail above. In addition to the above-described processing portions, the audio signal receiving apparatus 20 may include other processing portions. In the audio signal receiving apparatus 20 according to the embodiment, reception of the audio signal from externally connected equipment and two-way communication with externally connected equipment may be performed via wireless transmission or wired transmission, although wireless transmission is preferred.

An example of the functions of the audio signal receiving apparatus 20 according to the embodiment is described in the foregoing. Each of the above-described elements may be configured using a general-purpose member or circuit, or it may be configured by hardware specialized to the function of each element. Further, the function of each element may be entirely realized by CPU or the like. It is thereby possible to change the configuration to use as necessary according to the technique level when implementing the embodiment.

<Audio Signal Playback Mode of the Audio Signal Receiving Apparatus>

The audio signal playback mode in the audio signal receiving apparatus 20 according to the embodiment is described hereinafter in detail with reference to FIG. 17. FIG. 17 is an explanatory view illustrating the audio signal playback mode in the audio signal receiving apparatus 20 according to the embodiment.

The audio signal receiving apparatus 20 according to the embodiment can select one from two kinds of playback modes, party mode and separate mode, as shown in FIG. 17, for example. Referring to FIG. 17, the party mode allows many people to listen to the same sound source in a plurality of rooms using the audio signal receiving apparatus 20, which is the slave unit. The separate mode allows a person in a room where the audio signal transmitting apparatus 10, which is the master unit, is installed and a person in another room where the audio signal receiving apparatus 20 is installed to listen to different sound sources concurrently.

In the audio signal receiving apparatus 20 selecting the party mode, it is possible to listen to the same function (i.e. the sound source type) as the master unit (i.e. the audio signal transmitting apparatus 10) by way of the slave unit (i.e. the audio signal receiving apparatus 20) and to switch the function of the master unit by way of the slave unit. However, it is inhibited to listen to a different function from the master unit by way of the slave unit and to switch a different function from the master unit by way of the slave unit.

On the other hand, in the audio signal receiving apparatus 20 selecting the separate mode, it is possible to listen to the same function as the master unit by way of the slave unit, to listen to a different function from the master unit by way of the slave unit, and to switch a different function from the master unit by way of the slave unit. However, it is inhibited to switch the function of the master unit by way of the slave unit.

Further, in both the party mode and the separate mode, it is possible to perform simple running system control such as function selection and PLAY on the master unit from the slave unit. The performance specifications do not differ between the case of making a control from the slave unit and the case of making a control from the master unit. Further, when a control performed on the master unit by way of the slave unit is not effective, a notification indicating that the control has failed may not be given from the master unit to the slave unit. Furthermore, the key placed on the slave unit may be set so that the running system control is disabled for option, except for the CH key (for switching the function).

The display control portion 257 of the audio signal receiving apparatus 20 may display information indicating the state of the master unit, such as broadcast station information, track information and playback status, transmitted from the audio signal transmitting apparatus 10 on the display portion 215. Such information is displayed according to the display capability of the audio signal receiving apparatus 20 serving as the slave unit, and display specifications may differ by the audio signal receiving apparatus 20. Specifically, such information may be displayed not only as characters but also as icons.

Further, besides the slave unit, the master unit may also include a display portion so as to make a display indicating the slave unit to which the main unit function is set. As the display on the master unit, a list of IDs of the slave units to which the main unit function is set may be displayed, or display objects such as icons may be displayed in a row by previously registering the icon of each slave unit on the master unit.

If the audio signal being played back by the audio signal transmitting apparatus 10 as the master unit is a multi-channel source, the audio signal is down-mixed from a multi-channel signal to a 2-channel stereo signal and transmitted.

<Audio Signal Receiving Method>

An audio signal receiving method that is performed in the audio signal receiving apparatus 20 according to the embodiment is described hereinafter in detail with reference to FIGS. 18 to 19B. FIG. 18 is an explanatory view illustrating the playbackable sound source according to the embodiment. FIGS. 19A and 19B are explanatory views illustrating an example of the audio signal receiving method according to the embodiment. In the following description, the case where the audio signal receiving apparatus 20 is in the separate mode is described in detail.

First, the sound source information receiving portion 271 of the audio signal receiving apparatus 20 according to the embodiment receives sound source information containing sound source type information indicating the sound source type of the audio signal being transmitted through each of a plurality of channels and externally connected equipment playback sound source information indicating the sound source type of the audio signal being played back by the audio signal transmitting apparatus 10 from the audio signal transmitting apparatus 10. The sound source information receiving portion 271 transmits the received sound source type information to the audio signal receiving portion 277 and further transmits the received sound source type information and the externally connected equipment playback sound source information to the playbackable sound source setting portion 273.

Next, the playbackable sound source setting portion 273 sets a playbackable sound source based on the sound source information transmitted from the sound source information receiving portion 271. For example, as the sound source (function) corresponding to the main channel described in the received sound source type information, CD, DVD, BD, FM, AM, XM, DMPORT, AUDIO IN and so on are set to the playbackable sound source as shown in FIG. 18. Further, the playbackable sound source setting portion 273 sets "MAIN UNIT" as the main unit function indicating the sound source being played back in the audio signal transmitting apparatus 10 based on the externally connected equipment playback sound source information. At the time of setting the playbackable sound source, the playbackable sound source setting portion 273 may execute the processing by referring to a database or the like recorded in the storage portion 261.

Because the main unit function is a function that is set based on the externally connected equipment playback sound source information, the sound source type allocated to the main unit function changes each time the sound source being played back in the audio signal transmitting apparatus 10 changes. Specifically, when the audio signal transmitting apparatus 10 is playing back DVD, the sound source allocated to "MAIN UNIT" of the audio signal receiving apparatus 20 is DVD. When, on the other hand, the audio signal transmitting apparatus 10 is playing back CD, the sound source allocated to "MAIN UNIT" of the audio signal receiving apparatus 20 is CD.

As described above, because the "main unit function" that is a function for playing back the sound source being played back in the audio signal transmitting apparatus 10 as the master unit is further added as the sub-function in the audio signal receiving apparatus 20 according to the embodiment, the audio signal receiving apparatus 20 can perform playback in the same manner as in the party mode even when it is selecting the separate mode. When the audio signal receiving apparatus 20 is selecting the "main unit function" as the playback source, the control of the audio signal transmitting apparatus 10 as the master unit from the audio signal receiving apparatus 20 may be disabled.

Then, if a certain function is selected by the sound source selection portion 275, the audio signal receiving portion 277 receives the audio signal corresponding to the function that is selected by the sound source selection portion 275 based on the CH mapping contained in the sound source type information transmitted from the sound source information receiving portion 271 from the audio signal transmitting apparatus 10. The audio signal receiving portion 277 then transmits the received audio signal to the audio signal playback portion 255. At the time of selecting the sound source and receiving the audio signal, the sound source selection portion 275 and the audio signal receiving portion 277 may execute the processing by referring to a database or the like recorded in the storage portion 261.

After that, the audio signal playback portion 255 plays back the audio signal transmitted from the audio signal receiving portion 277. At the time of playing back the audio signal, the audio signal playback portion 255 may perform the audio signal playback processing by referring to a database or the like recorded in the storage portion 261.

By the method described in the foregoing, the audio signal receiving apparatus 20 according to the embodiment performs the processing to receive the audio signal. However, in the case where the audio signal transmitting apparatus 10 selects TUNER such as AM and FM as the function and where the audio signal receiving apparatus 20 selects TUNER such as AM and FM as the function, the following processing is further performed in the process of setting the playbackable sound source. This is because the audio signal transmitting apparatus 10 usually has only one tuner pack, and thus the audio signal transmitting apparatus 10 as the master unit is unable to receive AM broadcast and FM broadcast simultaneously. In the following description, the case where four kinds of functions, FM, AM, XM and DVD, exist as the functions of the audio signal transmitting apparatus 10, and five kinds of functions, MAIN UNIT, FM, AM, XM and DVD, exist as the functions of the audio signal receiving apparatus 20 is described as an example.

[The Case Where the Master Unit Selects TUNER when the Slave Unit Selects TUNER]

Consider, referring to FIG. 19SA, when the audio signal transmitting apparatus 10 as the master unit selects DVD and the audio signal receiving apparatus 20 as the slave unit selects AM (1), the master unit selects FM (2), for example. Because the master unit has only one tuner pack to receive TUNER such as AM and FM, if the master unit selects FM, only FM broadcast can be received after that. As a result, the TUNER band which the slave unit receives automatically changes from AM to FM (2). Further, when the audio signal received by the slave unit is switched from AM to FM, the playbackable sound source setting portion 273 of the audio signal receiving apparatus 20 records information indicating that the audio signal corresponding to AM has been received before the switching in the storage portion 261.

Then, when the TUNER which the master unit plays back is switched from FM to AM (3), the TUNER band which the slave unit receives also automatically changes to AM (3). After that, when the master unit switches the function from AM to XM (satellite digital radio) (4), because the master unit is capable of receiving the AM wave and the XM wave simultaneously, the function of the slave unit is switched to the former TUNER band that has been recorded (which is the AM broadcast in this case) (4).

[The Case Where the Slave Unit Selects TUNER when the Master Unit Selects TUNER]

Further, when the master unit is selecting AM or FM TUNER band as the function, it may be impossible for the slave unit to select a band different from the TUNER band being selected by the master unit, as the sub-function. Thus, if the slave unit tries to select a band different from the TUNER band being selected by the master unit, the sub-function associated with the band to be selected is automatically skipped.

For example, referring to FIG. 19B, when the master unit is playing back the AM TUNER band and the slave unit is playing back XM (1), if the slave unit selects the AM TUNER band (2), the slave unit can play back AM because the TUNER band being played back by the master unit and the TUNER band selected by the slave unit are the same. However, if the slave unit then tries to switch the TUNER band from AM to FM, the slave unit is unable to select FM because FM is different from the TUNER band being played back by the master unit. As a result, the function is automatically skipped to the function which the slave unit can select after FM (which is the MAIN UNIT function in the case of FIG. 19B).

In the above-described example related to TUNER, in the case where the same band (i.e. FM or AM) is selected, the slave unit can control the frequency to receive within the same band. Specifically, if the master unit and the slave unit are selecting the same band, e.g. FM, the slave unit can select a program of an arbitrary frequency in the FM broadcast.

As described above, in the audio signal receiving apparatus 20 according to the embodiment, the master unit that provides a sound source and the slave unit that plays back the sound source can select a sound source independently of each other, thereby preventing a control performed in one unit from affecting the listening environment of the other.

Further, because the slave unit dynamically generates a list of selections of sound sources, even in the case where it is unable to simultaneously select a plurality of sound sources independently from the slave unit due to hardware constraint, it is possible to select the same sound source as the master unit by presenting the sound source being played back in the master unit as one virtual sound source. Further, because the sound source that has been selected by the slave unit is recorded before the slave unit selects the same sound source as the maser unit, the sound source of the slave unit returns to an appropriate source (the recorded sound source) upon making a transition from the state where the master unit and the slave unit select the same sound source to the state where the master unit and the slave unit can independently select different sound sources, thereby preventing confusion of a user of the slave unit. Furthermore, besides recording the sound source that has been selected by the slave unit before the slave unit selects the same sound source as the maser unit, it is feasible to record information related to the function that has been selected just before into the storage portion each time the slave unit changes selection of the function.

First Alternative Embodiment

The audio signal receiving apparatus 20 according to the embodiment allows the slave unit to output the sound of the master unit by connecting the slave unit to the master unit that has the sound source itself or that is connected to the sound source by wired or wireless means. Further, the slave unit can select the sound source of the master unit, and the slave unit may select the same sound source as or a different sound source from the sound source being selected by the master unit.

When the slave unit is selecting the same sound source as the sound source being selected by the master unit, if the sound source is controlled by the operation made in the slave unit, it is disadvantages for a user who listens to the sound source from the master unit. Thus, in the first alternative embodiment of the audio signal receiving apparatus 20 according to the embodiment, a control from the slave unit is inhibited in such a case. Because the sound source is controlled by the operation in the master unit only in this case, a user at the end of the slave unit is confused unless such a status is presented by a certain means.

To avoid this, the sound source being selected by the master unit is treated as "MAIN UNIT (the sound source of the master unit)", and the sound source (sub-function) to be presented to the slave unit is dynamically set according to the sound source being selected in the master unit. In the audio signal receiving apparatus 20 according to the alternative embodiment, when the "MAIN UNIT" is being selected by the slave unit, sound source control at the end of the slave unit is disabled and an operation conforms to a control performed in the master unit.

<Configuration of the Audio Signal Receiving Apparatus>

The configuration of the audio signal receiving apparatus 20 according to the alternative embodiment is described firstly. The audio signal receiving apparatus 20 according to the alternative embodiment mainly includes a connection control portion 251, a transmission control portion 253, an audio signal playback portion 255, a display control portion 257, a storage portion 261, and a display portion 215. The connection control portion 251, the audio signal playback portion 255, the display control portion 257, the storage portion 261 and the display portion 215 have the same structure and substantially the same effects as those in the audio signal receiving apparatus 20 according to the first embodiment of the present invention, and therefore the detailed explanation is omitted. The transmission control portion 253 according to the alternative embodiment is described hereinafter in detail.

Figure 20:
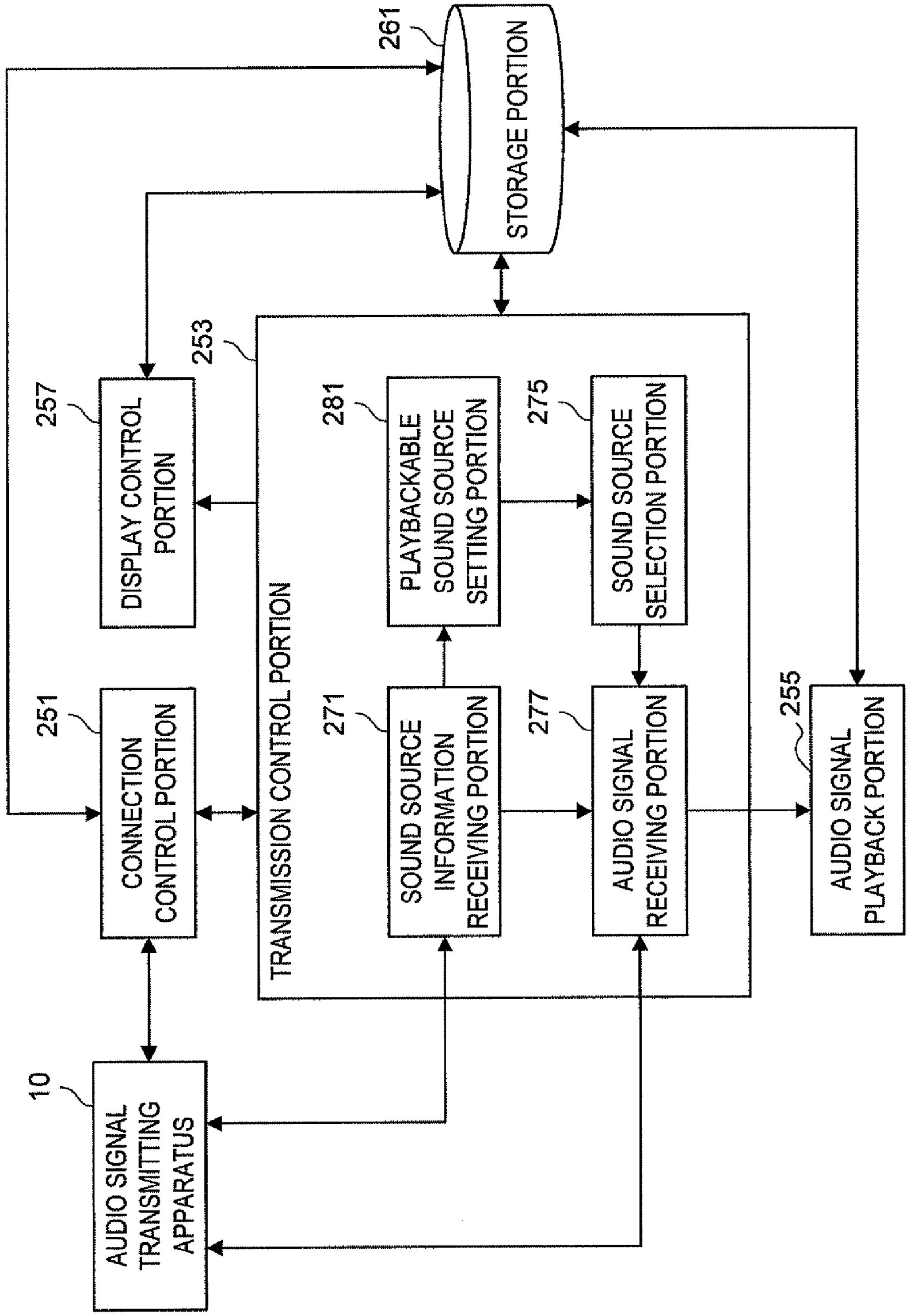
FIG. 20 is a block diagram illustrating a first alternative embodiment of the audio signal receiving apparatus according to the embodiment.

FIG. 20 is a block diagram illustrating the transmission control portion 253 of the audio signal receiving apparatus 20 according to the alternative embodiment. The transmission control portion 253 according to the alternative embodiment includes a sound source information receiving portion 271, a sound source selection portion 275, an audio signal receiving portion 277, and a playbackable sound source setting portion 281 as shown in FIG. 20, for example. The sound source information receiving portion 271, the sound source selection portion 275 and the audio signal receiving portion 277 have the same structure and substantially the same effects as those in the audio signal receiving apparatus 20 according to the first embodiment of the present invention, and therefore the detailed explanation is omitted.

The playbackable sound source setting portion 281 includes a CPU, ROM, RAM, EEPROM, DSP, an external device communication portion and so on, and it sets the sound source that can be played back in the audio signal receiving apparatus 20 based on the sound source type information transmitted from the sound source information receiving portion 271. Further, the playbackable sound source setting portion 281 transmits the sound source of the audio signal being played back in the audio signal transmitting apparatus 10 serving as externally connected equipment to the display control portion 257 so that it is displayed as "MAIN UNIT", not a display indicating the sound source type such as DVD and CD, based on the externally connected equipment playback sound source information transmitted from the sound source information receiving portion 271.

Specifically, the playbackable sound source setting portion 281 according to the alternative embodiment sets the sound source (i.e. TUNER such as DVD, CD, AM and FM or the function such as XM, DMPORT and AUDIO IN) corresponding to the audio signal allocated to the main channel as a playbackable sound source based on the sound source type information transmitted from the sound source information receiving portion 271. At this time, the sound source type described in the externally connected equipment playback sound source information is set to be displayed as "MAIN UNIT" rather than displayed by the function name.

The processing to set the playbackable sound source performed by the playbackable sound source setting portion 281 is described in further detail later.

An example of the functions of the audio signal receiving apparatus 20 according to the alternative embodiment is described in the foregoing. Each of the above-described elements may be configured using a general-purpose member or circuit, or it may be configured by hardware specialized to the function of each element. Further, the function of each element may be entirely realized by CPU or the like. It is thereby possible to change the configuration to use as necessary according to the technique level when implementing the embodiment.

<Audio Signal Receiving Method>

Figure 21:
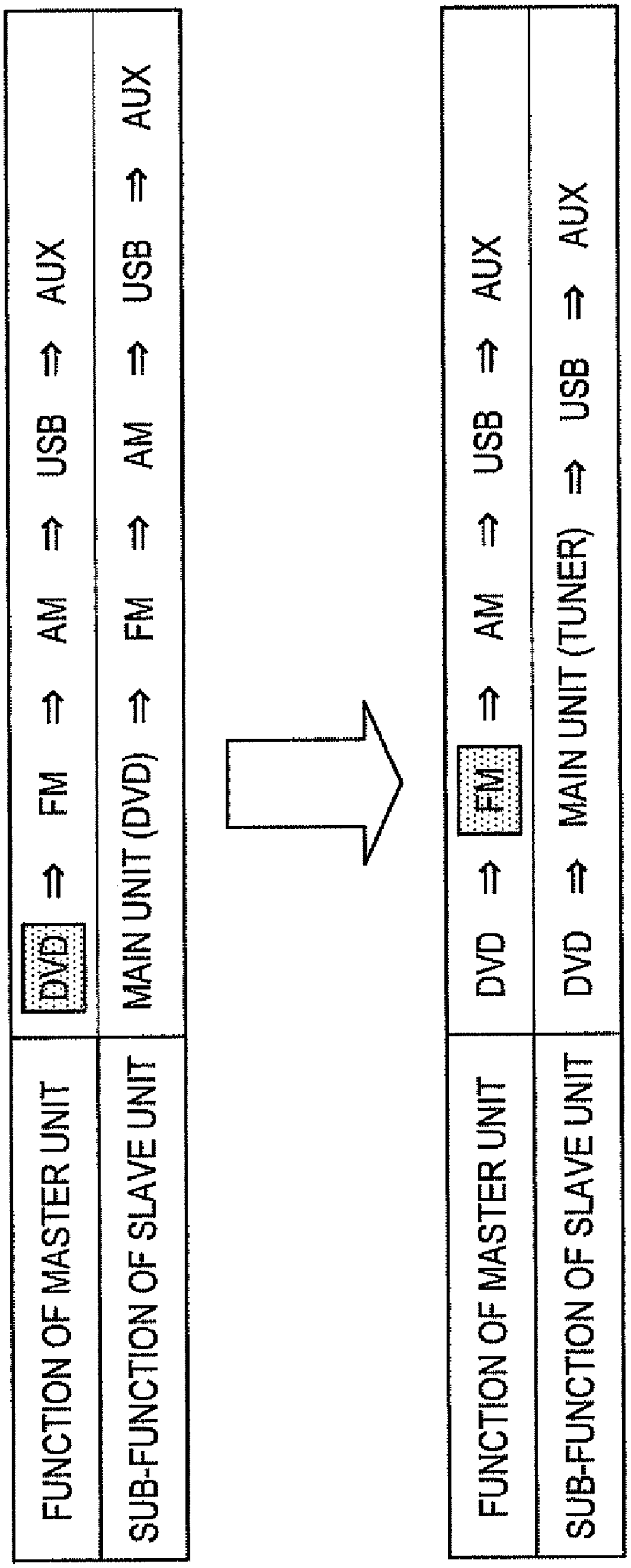
FIG. 21 is an explanatory view illustrating a playbackable sound source according to the alternative embodiment.
Figure 22A:
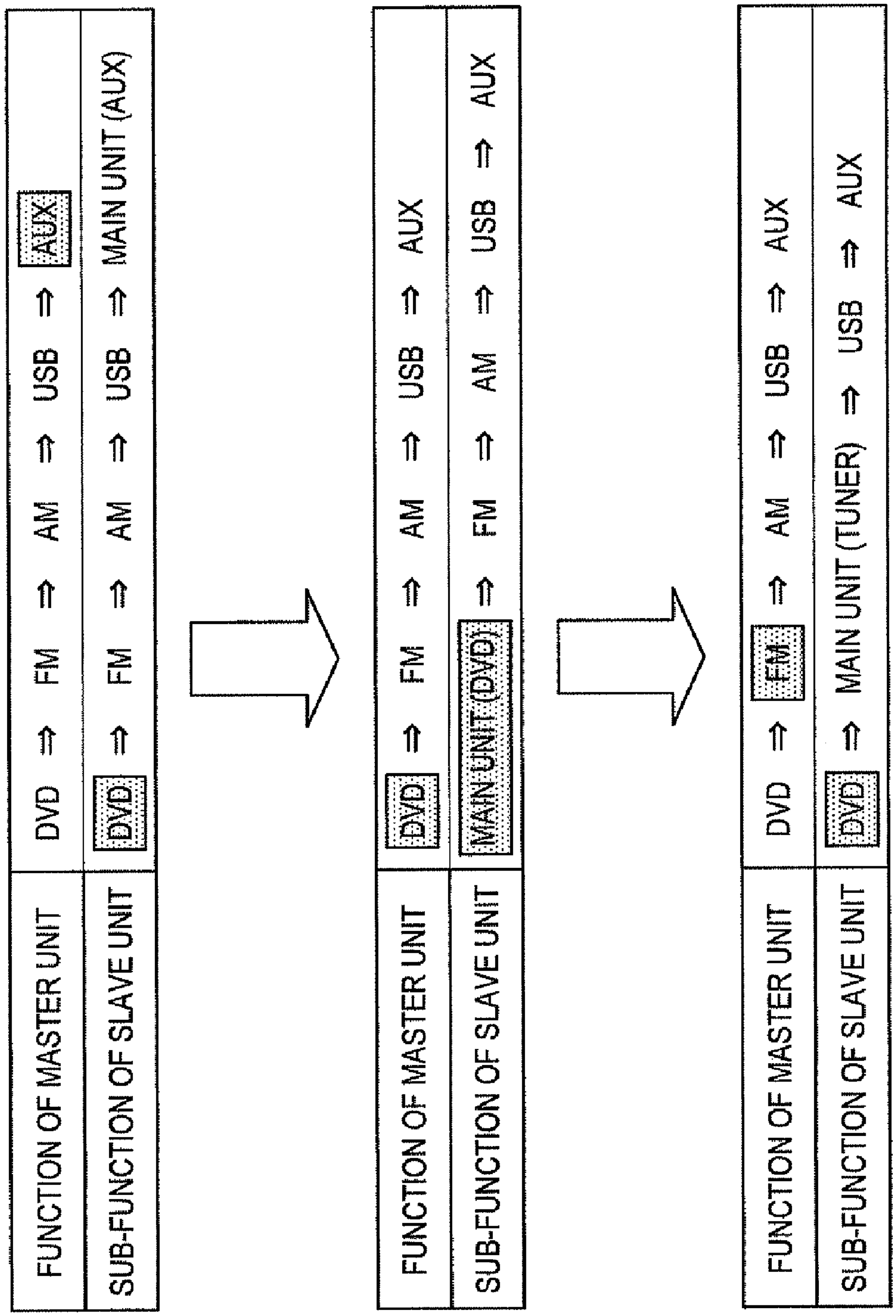
FIG. 22A is an explanatory view illustrating an example of an audio signal receiving method according to the alternative embodiment.
Figure 22B:
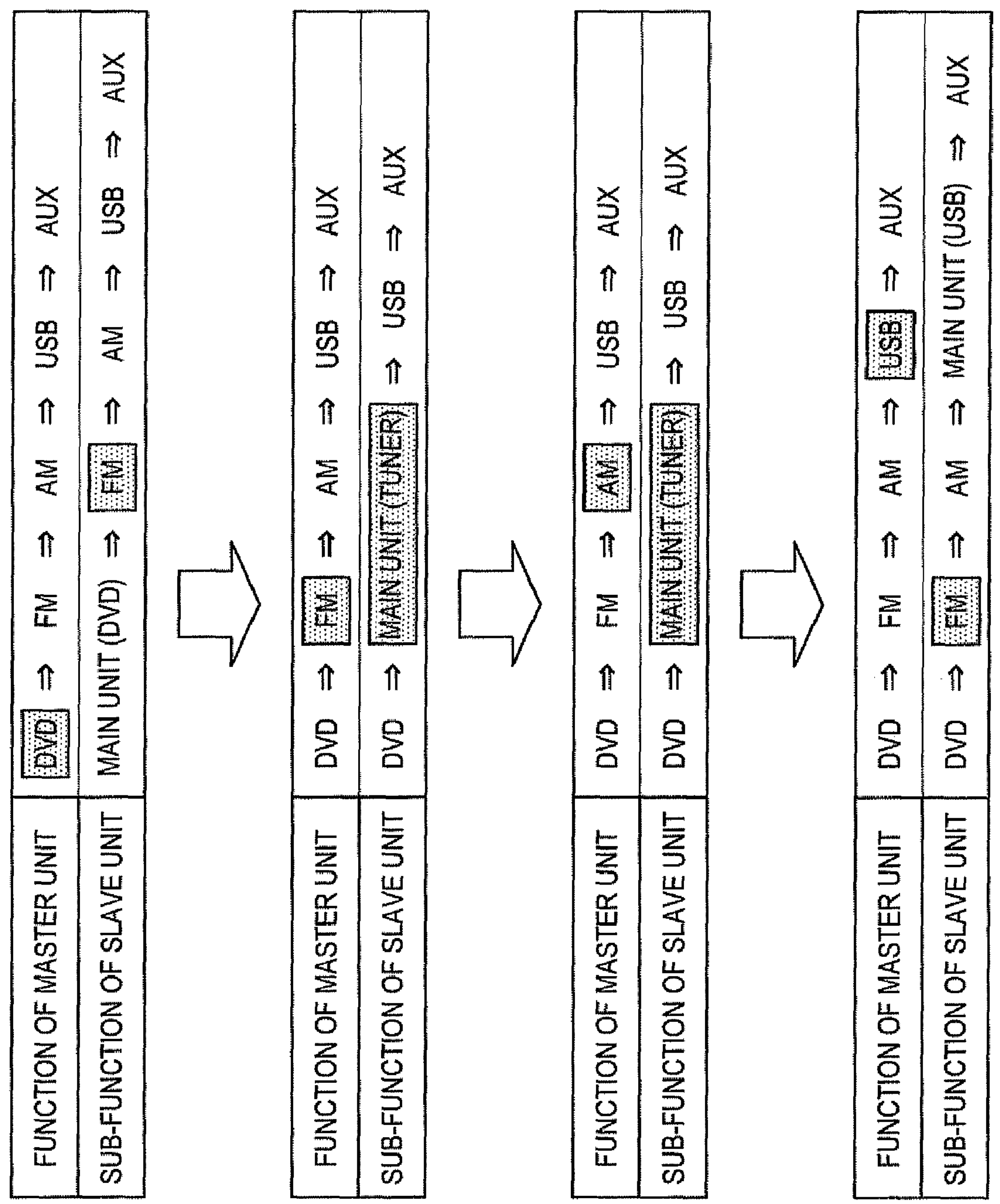
FIG. 22B is an explanatory view illustrating an example of an audio signal receiving method according to the alternative embodiment.

An audio signal receiving method that is performed in the audio signal receiving apparatus 20 according to the alternative embodiment is described hereinafter in detail with reference to FIGS. 21 to 22B. FIG. 21 is an explanatory view illustrating the playbackable sound source according to the alternative embodiment. FIGS. 22A and 22B are explanatory views illustrating an example of the audio signal receiving method according to the alternative embodiment. In the following description, the case where the audio signal receiving apparatus 20 is in the separate mode is described in detail.

First, the sound source information receiving portion 271 of the audio signal receiving apparatus 20 according to the alternative embodiment receives sound source information containing sound source type information indicating the sound source type of the audio signal being transmitted through each of a plurality of channels and externally connected equipment playback sound source information indicating the sound source type of the audio signal being played back by the audio signal transmitting apparatus 10 from the audio signal transmitting apparatus 10. The sound source information receiving portion 271 transmits the received sound source type information to the audio signal receiving portion 277 and further transmits the received sound source type information and the externally connected equipment playback sound source information to the playbackable sound source setting portion 281.

Next, the playbackable sound source setting portion 281 sets a playbackable sound source based on the sound source information transmitted from the sound source information receiving portion 271. For example, as the sound source (function) corresponding to the main channel described in the received sound source type information, DVD, FM, AM, USB, AUX and so on are set to the playbackable sound source as shown in FIG. 21. Further, the playbackable sound source setting portion 281 makes setting so as to display the sound source being played back in the audio signal transmitting apparatus 10 as "MAIN UNIT" based on the externally connected equipment playback sound source information. In the case shown in the upper part of FIG. 21, when DVD is described in the externally connected equipment playback sound source information, it is set so as to display "MAIN UNIT (DVD)", instead of "DVD".

Further, when the master unit changes the function from DVD to FM, which is the TUNER function, because the master unit usually has only one tuner pack, which is a device to receive TUNER, it is difficult for the slave unit to select the TUNER band independently of the master unit. Thus, in the audio signal receiving apparatus 20 according to the alternative embodiment, when the master unit is selecting FM or AM, which is TUNER, the slave unit performs setting so as to display the functions of FM and AM collectively as "MAIN UNIT (TUNER)" as shown in the lower part of FIG. 21. At the time of setting the playbackable sound source, the playbackable sound source setting portion 281 may execute the processing by referring to a database or the like recorded in the storage portion 261.

Because a displayed indication of the sub-function dynamically changes (it is displayed as MAIN UNIT) based on the externally connected equipment playback sound source information in the audio signal receiving apparatus 20 according to the alternative embodiment, a user of the audio signal receiving apparatus 20 according to the alternative embodiment can recognize that a control on the function displayed as MAIN UNIT is disabled in the slave unit and that the function displayed as MAIN UNIT is dependent on a control in the master unit.

Then, if a certain function is selected by the sound source selection portion 275, the audio signal receiving portion 277 receives the audio signal corresponding to the function that is selected by the sound source selection portion 275 based on the CH mapping contained in the sound source type information transmitted from the sound source information receiving portion 271 from the audio signal transmitting apparatus 10. The audio signal receiving portion 277 then transmits the received audio signal to the audio signal playback portion 255. At the time of selecting the sound source and receiving the audio signal, the sound source selection portion 275 and the audio signal receiving portion 277 may execute the processing by referring to a database or the like recorded in the storage portion 261.

After that, the audio signal playback portion 255 plays back the audio signal transmitted from the audio signal receiving portion 277. At the time of playing back the audio signal, the audio signal playback portion 255 may perform the audio signal playback processing by referring to a database or the like recorded in the storage portion 261.

An example of the audio signal receiving method is specifically described hereinafter with reference to FIGS. 22A and 22B. The example shown in FIG. 22A is the case where the master unit makes a transition to select the same sound source (function) as the sound source previously selected by the slave unit.

As shown in the upper part of FIG. 22A, when the master unit selects AUX and the slave unit selects DVD, a displayed indication of AUX in the slave unit is "MAIN UNIT (AUX)". Next, when the function selected by the master unit makes a transition from AUX to DVD, a displayed indication of DVD in the slave unit becomes "MAIN UNIT (DVD)" due to the transition in the master unit, and a sound source control from the slave unit, which has been executable, becomes disabled, although no change occurs in the sound source being played back in the slave unit. At this time, because a displayed indication in the slave unit changes to "MAIN UNIT (DVD)", a user of the slave unit can be informed of that fact. Then, when the function being selected by the master unit makes a transition from DVD to FM, the displayed indication of "MAIN UNIT (DVD)" in the slave unit changes to "DVD", so that a sound source control from the slave unit becomes enabled again. Further, with the transition of the function in the master unit, a displayed indication of FM and AM in the slave unit collectively change to "MAIN UNIT (TUNER)"

The example shown in FIG. 22B is the case where the master unit makes a transition to the function in which the master unit and the slave unit are unable to select the sound source independently of each other due to hardware constraint, such as TUNER.

As shown in FIG. 22B, when the master unit selects DVD and the slave unit selects FM, a displayed indication of DVD in the slave unit is "MAIN UNIT (DVD)". Next, when the function selected by the master unit makes a transition from DVD to FM, a displayed indication of "MAIN UNIT (DVD)" changes to "DVD", and "FM" changes to "MAIN UNIT (TUNER)" in the slave unit. With such a change, a control of FM from the slave unit becomes disabled, although the sound source being played back in the slave unit remains FM. Further, when the function selected by the master unit changes from FM to AM, the sound source being played back in the slave unit changes from FM to AM, although a displayed indication in the slave unit remains "MAIN UNIT (TUNER) ". With such a change, information indicating that FM has been played back until just before is recorded in the storage portion of the slave unit.

Then, when the function selected by the master unit changes from AM to USB, "MAIN UNIT (TUNER)" changes to "FM" and "AM", and "USB" changes to "MAIN UNIT (USB)" in the slave unit, so that FM is played back based on the information recorded in the storage portion. Further, because the functions changes from "MAIN UNIT (TUNER)" changes to FM and AM, a control of FM in the slave unit becomes enabled.

As described in the foregoing, in the audio signal receiving apparatus according to the alternative embodiment, a control of the master unit from the slave unit is inhibited for the function displayed as "MAIN UNIT". Accordingly, a user of the audio signal receiving apparatus can recognize that a control of the master unit is disabled for the function with a displayed indication of "MAIN UNIT".

In this manner, the master unit that provides a sound source and the slave unit that plays back the sound source can select a sound source independently of each other in the audio signal receiving apparatus according to the alternative embodiment, thereby preventing a control performed in one unit from affecting the listening environment of the other. Further, in the case where it is unable to select a sound source independently such as when the master unit and the slave unit select the same sound source, a sound source control from the slave unit is inhibited, thereby preventing negative effects on the listening environment of the master unit. Further, when the master unit and the slave unit select the same sound source, such a state is displayed on the slave unit so as to notify a user that a control is restricted in the slave unit, thereby preventing confusion of a user of the slave unit.

Further, because the slave unit dynamically generates a list of selections of sound sources, even in the case where it is unable to simultaneously select a plurality of sound sources independently from the slave unit due to hardware constraint, it is possible to select the same sound source as the master unit by presenting the sound source being played back in the master unit as one virtual sound source. Further, because the sound source that has been selected by the slave unit is recorded before the slave unit selects the same source as the maser unit, the sound source of the slave unit returns to an appropriate source (the recorded sound source) upon making a transition from the state where the master unit and the slave unit select the same sound source to the state where the master unit and the slave unit can independently select different sound sources, thereby preventing confusion of a user of the slave unit.

It should be understood by those skilled in the art that various modifications, combinations, sub-combinations and alterations may occur depending on design requirements and other factors insofar as they are within the scope of the appended claims or the equivalents thereof.

What is claimed is:

1. An audio signal receiving apparatus to receive an audio signal transmitted from externally connected equipment through a plurality of channels, comprising:

a sound source information receiving portion to receive sound source information containing sound source type information indicating a sound source type of the audio signal being transmitted through each of the plurality of channels and externally connected equipment playback sound source information indicating a sound source type of the audio signal being played back by the externally connected equipment;

an audio signal receiving portion to receive the audio signal transmitted through each of the plurality of channels; and a playbackable sound source setting portion to determine and set a sound source type of the audio signal able to be played back to a playbackable sound source based on the sound source information, wherein the playbackable sound source setting portion sets the sound source type of the audio signal being played back by the externally connected equipment to the playbackable sound source.

2. The audio signal receiving apparatus according to claim 1, further comprising:

a sound source selection portion to select a sound source to be played back from the playbackable sound source.

3. The audio signal receiving apparatus according to claim 2, wherein when the sound source selection portion selects the audio signal corresponding to a first channel and the externally connected equipment playback sound source information changes to information indicating the audio signal corresponding to the first channel, the playbackable sound source setting portion stores a state of the audio signal receiving apparatus immediately before the change.

4. The audio signal receiving apparatus according to claim 2, wherein when the externally connected equipment playback sound source information is information indicating the audio signal corresponding to a first channel and the sound source selection portion selects the audio signal corresponding to the first channel, the playbackable sound source setting portion inhibits selection of a band different from a band of the first channel being played back by the externally connected equipment.

5. The audio signal receiving apparatus according to claim 1, further comprising:

a display portion to display prescribed information, wherein the display portion displays information indicating a sound source of the audio signal being played back by the externally connected equipment and information indicating the sound source type being played back by the externally connected equipment.

6. The audio signal receiving apparatus according to claim 1, wherein the playbackable sound source setting portion changes a displayed indication of the sound source type described in the externally connected equipment playback sound source information so as to indicate the sound source type being played back by the externally connected equipment.

7. The audio signal receiving apparatus according to claim 1, wherein when the audio signal receiving portion receives the audio signal corresponding to the sound source type described in the externally connected equipment playback sound source information, a control of the externally connected equipment by the audio signal receiving apparatus is inhibited.

8. An audio signal receiving method to receive an audio signal transmitted from externally connected equipment through a plurality of channels, comprising the steps of:

receiving sound source information containing sound source type information indicating a sound source type of the audio signal being transmitted through each of the plurality of channels and externally connected equipment playback sound source information indicating a sound source type of the audio signal being played back by the externally connected equipment from the externally connected equipment;

determining and setting a sound source type of the audio signal able to be played back to a playbackable sound source based on the sound source information, and setting a sound source of the audio signal being played back by the externally connected equipment to the playbackable sound source as an externally connected equipment playback sound source; and receiving the audio signal from the externally connected equipment.

9. An audio signal transmission system including an audio signal transmitting apparatus to transmit an audio signal through a plurality of channels and an audio signal receiving apparatus to receive the audio signal transmitted from the audio signal transmitting apparatus, wherein the audio signal transmitting apparatus includes:

a transmission control portion to transmit sound source information containing sound source type information indicating a sound source type of the audio signal being transmitted through each of the plurality of channels and externally connected equipment playback sound source information indicating a sound source type of the audio signal being played back by the audio signal transmitting apparatus to the audio signal receiving apparatus; and an audio signal transmitting portion to transmit the audio signal to the audio signal receiving apparatus, and the audio signal receiving apparatus includes:

a sound source information receiving portion to receive the sound source information containing sound source type information indicating the sound source type of the audio signal being transmitted through each of the plurality of channels and the externally connected equipment playback sound source information indicating the sound source type of the audio signal being played back by the audio signal transmitting apparatus from the audio signal transmitting apparatus;

an audio signal receiving portion to receive the audio signal from the audio signal transmitting apparatus; and a playbackable sound source setting portion to determine and set a sound source type of the audio signal able to be played back to a playbackable sound source based on the sound source information, wherein the playbackable sound source setting portion sets a sound source of the audio signal being played back by the audio signal transmitting apparatus to the playbackable sound source.

* * * * *